US008700456B2

(12) United States Patent
Walker et al.

(10) Patent No.: US 8,700,456 B2
(45) Date of Patent: *Apr. 15, 2014

(54) METHOD AND APPARATUS FOR PROVIDING CROSS-BENEFITS BASED ON A CUSTOMER ACTIVITY

(75) Inventors: Jay S. Walker, Ridgefield, CT (US); Daniel E. Tedesco, Huntington, CT (US); Stephen C. Tulley, Monroe, CT (US); John M. Packes, Jr., Norwalk, CT (US); Deirdre O'Shea, Orinda, CA (US); Keith Bemer, Pittsburgh, PA (US); James A. Jorasch, New York, NY (US); Dean Alderucci, Westport, CT (US)

(73) Assignee: Inventor Holdings, LLC, Stamford, CT (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/938,046

(22) Filed: Nov. 2, 2010

(65) Prior Publication Data
US 2011/0047022 A1 Feb. 24, 2011

Related U.S. Application Data

(63) Continuation of application No. 09/282,747, filed on Mar. 31, 1999, now Pat. No. 7,827,057, which is a continuation-in-part of application No. 09/219,267, filed on Dec. 23, 1998, now Pat. No. 7,831,470, and a continuation-in-part of application No. 09/274,281, filed on Mar. 22, 1999, now Pat. No. 7,818,284, which is a continuation-in-part of application No. 09/219,267, filed on Dec. 23, 1998, now Pat. No. 7,831,470, said application No. 09/282,747 is a continuation-in-part of application No. 09/166,367, filed on Oct. 5, 1998, now abandoned.

(51) Int. Cl.
G06Q 30/00 (2012.01)
(52) U.S. Cl.
USPC .......... 705/14.23; 705/14.1; 705/14.11; 705/14.34; 705/14.36; 705/14.38; 705/14.39; 705/26.1; 705/300; 709/218
(58) Field of Classification Search
USPC .................. 705/14–300; 709/218
See application file for complete search history.

(56) References Cited

U.S. PATENT DOCUMENTS 3,573,747 A 4/1971 Adams et al.
4,108,361 A 8/1978 Krause
(Continued)

FOREIGN PATENT DOCUMENTS

EP 0 109 189 A1 5/1984
EP 512413 11/1992
(Continued)

OTHER PUBLICATIONS

Sprint Opens First Superstore in Mechanicsburg, Central Penn Business Journal, Nov. 3, 1993, 3 pp.

(Continued)

Primary Examiner — Tri V Nguyen
(74) Attorney, Agent, or Firm — Fincham Downs, LLC; Michael D. Downs

(57) ABSTRACT

In accordance with some embodiments of the present invention, a controller receives an indication of acceptance by a customer of an offer for a subsidy from a second vendor (e.g., a subsidizing vendor). The offer may define, for example, a reduction in the price charged for an item purchased from a first vendor and an obligation for the customer to fulfill in exchange for the subsidy. The customer is charged a second price for the items, which is less than the total price, and may even be zero.

18 Claims, 19 Drawing Sheets

(56) References Cited

U.S. PATENT DOCUMENTS

| | | | |
|---|---|---|---|
| 4,247,759 A | 1/1981 | Yuris et al. | |
| 4,323,770 A | 4/1982 | Dieulot et al. | |
| 4,449,186 A | 5/1984 | Kelly et al. | |
| 4,484,733 A | 11/1984 | Loos et al. | |
| 4,491,725 A | 1/1985 | Pritchard | |
| 4,494,197 A | 1/1985 | Troy et al. | |
| 4,500,880 A | 2/1985 | Gomersall et al. | |
| 4,553,222 A | 11/1985 | Kurland et al. | |
| 4,667,292 A | 5/1987 | Mohlenbrock et al. | |
| 4,669,730 A | 6/1987 | Small | |
| 4,677,553 A | 6/1987 | Roberts et al. | |
| 4,689,742 A | 8/1987 | Troy et al. | |
| 4,718,009 A * | 1/1988 | Cuervo | 705/38 |
| 4,723,212 A | 2/1988 | Mindrum et al. | |
| 4,750,119 A | 6/1988 | Cohen et al. | |
| 4,751,728 A | 6/1988 | Treat | |
| 4,760,247 A | 7/1988 | Keane et al. | |
| 4,789,928 A | 12/1988 | Fujisaki | |
| 4,799,156 A | 1/1989 | Shavit et al. | |
| 4,815,741 A | 3/1989 | Small | |
| 4,833,308 A | 5/1989 | Humble | |
| 4,839,507 A | 6/1989 | May | |
| 4,854,590 A | 8/1989 | Jolliff et al. | |
| 4,859,838 A | 8/1989 | Okiharu | |
| 4,876,592 A | 10/1989 | Von Kohorn | |
| 4,882,473 A | 11/1989 | Bergeron et al. | |
| 4,902,880 A | 2/1990 | Garczynski et al. | |
| 4,903,201 A | 2/1990 | Wagner | |
| 4,908,761 A | 3/1990 | Tai | |
| 4,910,672 A | 3/1990 | Off et al. | |
| 4,922,522 A | 5/1990 | Scanlon | |
| 4,937,853 A | 6/1990 | Brule et al. | |
| 4,973,952 A | 11/1990 | Malec et al. | |
| 4,982,337 A | 1/1991 | Burr et al. | |
| 4,982,346 A | 1/1991 | Girouard et al. | |
| 4,993,714 A | 2/1991 | Golightly | |
| 5,003,384 A | 3/1991 | Durden et al. | |
| 5,021,953 A | 6/1991 | Webber | |
| 5,025,372 A | 6/1991 | Burton et al. | |
| 5,056,019 A | 10/1991 | Schultz et al. | |
| 5,060,165 A | 10/1991 | Schumacher et al. | |
| 5,119,295 A | 6/1992 | Kapur | |
| 5,128,862 A | 7/1992 | Mueller | |
| 5,132,914 A | 7/1992 | Cahlander et al. | |
| 5,136,501 A | 8/1992 | Silverman et al. | |
| 5,168,446 A | 12/1992 | Wiseman | |
| 5,172,328 A | 12/1992 | Cahlander et al. | |
| 5,173,851 A | 12/1992 | Off et al. | |
| 5,177,342 A | 1/1993 | Adams | |
| 5,189,607 A | 2/1993 | Shirasaki et al. | |
| 5,191,613 A | 3/1993 | Graziano et al. | |
| 5,192,854 A | 3/1993 | Counts | |
| 5,200,889 A | 4/1993 | Mori | |
| 5,201,010 A | 4/1993 | Deaton et al. | |
| 5,202,826 A | 4/1993 | McCarthy | |
| 5,216,595 A | 6/1993 | Protheroe | |
| 5,223,698 A | 6/1993 | Kapur | |
| 5,224,034 A | 6/1993 | Katz et al. | |
| 5,231,569 A | 7/1993 | Myatt et al. | |
| 5,239,165 A | 8/1993 | Novak | |
| RE34,380 E | 9/1993 | Sleevi | |
| 5,243,515 A | 9/1993 | Lee | |
| 5,245,533 A | 9/1993 | Marshall | |
| 5,256,863 A | 10/1993 | Ferguson et al. | |
| 5,262,941 A | 11/1993 | Saladin et al. | |
| 5,274,547 A | 12/1993 | Zoffel et al. | |
| 5,283,731 A | 2/1994 | Lalonde et al. | |
| 5,287,268 A | 2/1994 | McCarthy | |
| 5,297,026 A | 3/1994 | Hoffman | |
| 5,297,031 A | 3/1994 | Gutterman et al. | |
| 5,302,811 A | 4/1994 | Fukatsu | |
| 5,305,195 A | 4/1994 | Murphy | |
| 5,309,355 A | 5/1994 | Lockwood | |
| 5,315,093 A | 5/1994 | Stewart | |
| 5,319,542 A | 6/1994 | King et al. | |
| 5,329,589 A | 7/1994 | Fraser et al. | |
| 5,333,186 A | 7/1994 | Gupta | |
| 5,353,218 A | 10/1994 | De Lapa et al. | |
| 5,353,219 A | 10/1994 | Mueller et al. | |
| 5,361,199 A | 11/1994 | Shoquist et al. | |
| 5,367,450 A | 11/1994 | Pintsov | |
| 5,371,796 A | 12/1994 | Avarne | |
| 5,380,991 A | 1/1995 | Valencia et al. | |
| RE34,915 E | 4/1995 | Nichtberger et al. | |
| 5,404,291 A | 4/1995 | Kerr et al. | |
| RE34,954 E | 5/1995 | Haber | |
| 5,420,606 A | 5/1995 | Begum et al. | |
| 5,420,914 A | 5/1995 | Blumhardt | |
| 5,426,281 A | 6/1995 | Abecassis | |
| 5,434,394 A * | 7/1995 | Roach et al. | 235/375 |
| 5,444,630 A | 8/1995 | Dlugos | |
| 5,450,938 A | 9/1995 | Rademacher | |
| 5,459,306 A | 10/1995 | Stein et al. | |
| 5,467,269 A | 11/1995 | Flaten | |
| 5,481,094 A | 1/1996 | Suda | |
| 5,504,475 A | 4/1996 | Houdou et al. | |
| 5,510,979 A | 4/1996 | Moderi et al. | |
| 5,515,270 A * | 5/1996 | Weinblatt | 705/14.25 |
| 5,517,555 A | 5/1996 | Amadon et al. | |
| 5,519,769 A | 5/1996 | Weinberger et al. | |
| 5,523,794 A | 6/1996 | Mankovitz et al. | |
| 5,537,314 A * | 7/1996 | Kanter | 705/14.13 |
| 5,539,189 A | 7/1996 | Wilson | |
| 5,553,131 A | 9/1996 | Minervino, Jr. et al. | |
| 5,557,518 A | 9/1996 | Rosen | |
| 5,564,546 A | 10/1996 | Molbak et al. | |
| 5,570,417 A | 10/1996 | Byers | |
| 5,572,653 A | 11/1996 | DeTemple et al. | |
| 5,581,064 A | 12/1996 | Riley et al. | |
| 5,592,375 A | 1/1997 | Salmon et al. | |
| 5,592,376 A | 1/1997 | Hodroff | |
| 5,602,377 A | 2/1997 | Beller et al. | |
| 5,606,602 A | 2/1997 | Johnson et al. | |
| 5,611,052 A | 3/1997 | Dykstra et al. | |
| 5,612,868 A | 3/1997 | Off et al. | |
| 5,615,269 A | 3/1997 | Micali | |
| 5,619,558 A * | 4/1997 | Jheeta | 379/92.01 |
| 5,620,079 A | 4/1997 | Molbak | |
| 5,621,201 A | 4/1997 | Langhans et al. | |
| 5,621,640 A | 4/1997 | Burke | |
| 5,621,812 A | 4/1997 | Deaton et al. | |
| 5,632,010 A | 5/1997 | Briechle et al. | |
| 5,636,346 A * | 6/1997 | Saxe | 705/1.1 |
| 5,638,457 A | 6/1997 | Deaton et al. | |
| 5,642,279 A | 6/1997 | Bloomberg et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,652,784 A | 7/1997 | Blen et al. | |
| 5,655,007 A | 8/1997 | McAllister | |
| 5,655,089 A | 8/1997 | Bucci | |
| 5,664,115 A | 9/1997 | Fraser | |
| 5,665,953 A | 9/1997 | Mazzamuto et al. | |
| 5,666,649 A | 9/1997 | Dent | |
| 5,673,317 A | 9/1997 | Cooper | |
| 5,684,965 A | 11/1997 | Pickering | |
| 5,687,322 A | 11/1997 | Deaton et al. | |
| 5,689,100 A | 11/1997 | Carrithers et al. | |
| 5,689,652 A | 11/1997 | Lupien et al. | |
| 5,694,551 A | 12/1997 | Doyle et al. | |
| 5,708,782 A | 1/1998 | Larson et al. | |
| 5,710,884 A | 1/1998 | Dedrick | |
| 5,715,402 A | 2/1998 | Popolo | |
| 5,717,860 A | 2/1998 | Graber et al. | |
| 5,717,866 A | 2/1998 | Naftzger | |
| 5,721,827 A * | 2/1998 | Logan et al. | 709/217 |
| 5,724,521 A | 3/1998 | Dedrick | |
| 5,724,525 A | 3/1998 | Beyers, II et al. | |
| 5,724,886 A | 3/1998 | Ewald et al. | |
| 5,727,153 A | 3/1998 | Powell | |
| 5,729,693 A | 3/1998 | Holda-Fleck | |
| 5,732,400 A | 3/1998 | Mandler et al. | |

(56) References Cited

U.S. PATENT DOCUMENTS

| | | | |
|---|---|---|---|
| 5,734,838 A | 3/1998 | Robinson et al. | |
| 5,734,890 A * | 3/1998 | Case et al. ............................ | 1/1 |
| 5,745,882 A | 4/1998 | Bixler et al. | |
| 5,752,238 A | 5/1998 | Dedrick | |
| 5,758,328 A | 5/1998 | Giovannoli | |
| 5,759,101 A | 6/1998 | Von Kohorn | |
| 5,761,647 A | 6/1998 | Boushy | |
| 5,761,648 A | 6/1998 | Golden et al. | |
| 5,774,868 A | 6/1998 | Cragun et al. | |
| 5,774,869 A | 6/1998 | Toader | |
| 5,794,207 A | 8/1998 | Walker et al. | |
| 5,794,210 A | 8/1998 | Goldhaber et al. | |
| 5,794,219 A | 8/1998 | Brown | |
| 5,794,220 A | 8/1998 | Hunt | |
| 5,794,221 A | 8/1998 | Egendorf | |
| 5,806,044 A | 9/1998 | Powell | |
| 5,806,045 A | 9/1998 | Biorge et al. | |
| 5,812,769 A | 9/1998 | Graber et al. | |
| 5,819,092 A | 10/1998 | Ferguson et al. | |
| 5,822,736 A | 10/1998 | Hartman et al. | |
| 5,825,881 A | 10/1998 | Colvin, Sr. | |
| 5,826,240 A * | 10/1998 | Brockman et al. ........... | 705/7.15 |
| 5,826,244 A | 10/1998 | Huberman | |
| 5,832,457 A | 11/1998 | O'Brien et al. | |
| 5,835,896 A | 11/1998 | Fisher et al. | |
| 5,839,117 A * | 11/1998 | Cameron et al. ............. | 705/27.1 |
| 5,839,119 A | 11/1998 | Krsul et al. | |
| 5,845,259 A | 12/1998 | West et al. | |
| 5,845,265 A | 12/1998 | Woolston | |
| 5,852,811 A * | 12/1998 | Atkins ........................ | 705/36 R |
| 5,855,008 A | 12/1998 | Goldhaber et al. | |
| 5,857,175 A | 1/1999 | Day et al. | |
| 5,864,822 A | 1/1999 | Baker, III | |
| 5,870,030 A | 2/1999 | DeLuca et al. | |
| 5,873,068 A | 2/1999 | Beaumont et al. | |
| 5,873,069 A | 2/1999 | Reuhl et al. | |
| 5,884,292 A | 3/1999 | Baker et al. | |
| 5,890,135 A | 3/1999 | Powell | |
| 5,890,718 A | 4/1999 | Byon | |
| 5,893,075 A | 4/1999 | Plainfield et al. | |
| 5,918,211 A | 6/1999 | Sloane | |
| 5,923,016 A | 7/1999 | Fredregill et al. | |
| 5,925,865 A * | 7/1999 | Steger ............................ | 235/379 |
| 5,937,037 A | 8/1999 | Karnel et al. | |
| 5,946,665 A | 8/1999 | Suzuki et al. | |
| 5,970,469 A | 10/1999 | Scroggie et al. | |
| 5,974,399 A * | 10/1999 | Giuliani et al. ............. | 705/14.25 |
| 6,014,634 A | 1/2000 | Scroggie et al. | |
| 6,026,370 A | 2/2000 | Jermyn | |
| 6,035,281 A | 3/2000 | Crosskey et al. | |
| 6,055,513 A * | 4/2000 | Katz et al. .................. | 705/26.41 |
| 6,064,987 A | 5/2000 | Walker et al. | |
| 6,076,068 A | 6/2000 | DeLapa et al. | |
| 6,138,105 A | 10/2000 | Walker et al. | |
| 6,173,274 B1 | 1/2001 | Ryan, Jr. | |
| 6,178,411 B1 | 1/2001 | Reiter | |
| 6,185,545 B1 | 2/2001 | Resnick et al. | |
| 6,223,163 B1 | 4/2001 | Van Luchene | |
| 6,259,908 B1 | 7/2001 | Austin | |
| 6,289,318 B1 * | 9/2001 | Barber ........................ | 705/14.16 |
| 6,298,329 B1 | 10/2001 | Walker et al. | |
| 6,298,331 B1 | 10/2001 | Walker et al. | |
| 6,327,580 B1 | 12/2001 | Pierce et al. | |
| 6,332,128 B1 | 12/2001 | Nicholson | |
| 6,336,095 B1 | 1/2002 | Rosen | |
| 6,336,099 B1 | 1/2002 | Barnett et al. | |
| 6,349,288 B1 | 2/2002 | Barber | |
| 6,405,174 B1 | 6/2002 | Walker et al. | |
| 6,456,981 B1 | 9/2002 | Dejaeger et al. | |
| 2001/0014868 A1 | 8/2001 | Herz et al. | |

FOREIGN PATENT DOCUMENTS

| | | |
|---|---|---|
| EP | 0 607 686 A2 | 7/1994 |
| EP | 0 809 202 A2 | 11/1997 |
| EP | 0 902 381 A2 | 3/1999 |
| JP | 405257950 A | 10/1993 |
| JP | 410187318 A | 7/1998 |
| WO | WO 95/03570 | 2/1995 |
| WO | WO 96/31848 | 1/1996 |
| WO | WO 96/31848 A2 | 10/1996 |
| WO | WO 96/36926 | 11/1996 |
| WO | WO 97/20279 | 6/1997 |
| WO | WO 97/35441 | 9/1997 |
| WO | WO 98/06050 | 2/1998 |
| WO | WO 98/26363 | 6/1998 |
| WO | WO 98/34187 | 8/1998 |

OTHER PUBLICATIONS

Simple, Fast and Flexible Defines Hotel Giant's Exciting, New Rewards Program, Starwood Preferred Guest, PR Newswire, Feb. 3, 1999, 3 pp.

Nextcard internet VISA account, Jan. 6, 1999, 2 pp.

Anonymous, Discount Store News, Manufacturers shine with cross promotional prowess, Aug. 5, 1996, 2 pp.

Donlon, Brian "Cable Industry channels its efforts in April," Mar. 29, 1990, 2 pp.

Blattberg, Robert C and Levin, Alan, "Modeling the Effectiveness and Profitability of Trade Promotions", Marketing Science, 1987.

Marn, Michael, Rosiello, Robert L., Managing Price, gaining profit, Autumn 1992, 10 pp.

Howard, Lisa S., RM sees outsourcing challenge, National Underwriter Property & Casualty-Risk & Benefits Management, Nov. 24, 1997, 2 pp.

Shamrock Technology Co. establishes No. American HQ as monitor manufacturer continues market expansion, Business Wire, Mar. 25, 1997, 2 pp.

Jensen, Elizabeth, "Yaking It Up" The Wall Street Journal Europe, Apr. 28, 1998, 5 pg.

Travel Agent No Show Crackdown, vol. 287, No. 6, Aug. 18, 1997, 4 pp.

Board of Appeals Decision for U.S. Appl. No. 09/540,034 decided May 16, 2007, 16 pp.

Examiner's Answer for U.S. Appl. No. 09/540,034 mailed Jan. 23, 2006, 44 pp.

Office Action for U.S. Appl. No. 09/540,034 mailed Oct. 10, 2003, 21 pp.

Office Action for U.S. Appl. No. 09/540,034 mailed Jan. 14, 2003, 21 pp.

Office Action for U.S. Appl. No. 09/219,267 mailed Sep. 7, 2007, 18 pp.

Office Action for U.S. Appl. No. 09/219,267 mailed Mar. 6, 2006, 19 pp.

Office Action for U.S. Appl. No. 09/219,267 mailed Dec. 14, 2004, 24 pp.

Office Action for U.S. Appl. No. 09/219,267 mailed Jan. 9, 2004, 27 pp.

Office Action for U.S. Appl. No. 09/219,267 Apr. 22, 2003, 17 pp.

Office Action for U.S. Appl. No. 09/219,267 mailed Feb. 14, 2002, 14 pp.

Office Action for U.S. Appl. No. 09/219,267 mailed May 17, 2001, 14 pp.

Office Action for U.S. Appl. No. 09/579,215 mailed Jul. 12, 2007, 18 pp.

Office Action for U.S. Appl. No. 09/579,215 mailed Mar. 6, 2006, 19 pp.

Office Action for U.S. Appl. No. 09/579,215 mailed Dec. 17, 2004, 20 pp.

Office Action for U.S. Appl. No. 09/579,215 mailed Apr. 7, 2004, 32 pp.

Office Action for U.S. Appl. No. 09/579,215 mailed Jul. 29, 2003, 20 pp.

Office Action for U.S. Appl. No. 11/423,481 mailed Oct. 9, 2007, 24 pp.

(56) References Cited

OTHER PUBLICATIONS

Office Action for U.S. Appl. No. 11/423,481 mailed Jan. 25, 2007, 6 pp.
Office Action for U.S. Appl. No. 11/423,493 mailed Oct. 18, 2007, 21 pp.
Office Action for U.S. Appl. No. 11/423,493 mailed Jan. 26, 2007, 6 pp.
Office Action for U.S. Appl. No. 11/423,498 mailed Oct. 18, 2007, 9 pp.
Office Action for U.S. Appl. No. 11/423,498 mailed Jan. 26, 2007, 6 pp.
Office Action for U.S. Appl. No. 09/274,281 mailed Jun. 29, 2007, 5 pp.
Examiner's Answer for U.S. Appl. No. 09/274,281 mailed Oct. 31, 2006, 13 pp.
Office Action for U.S. Appl. No. 09/274,281 mailed Jul. 27, 2005, 9 pp.
Office Action for U.S. Appl. No. 09/274,281 mailed Apr. 10, 2003, 7 pp.
Office Action for U.S. Appl. No. 09/274,281 mailed Apr. 12, 2002, 9 pp.
Office Action for U.S. Appl. No. 09/322,351 mailed Aug. 20, 2007, 25 pp.
Office Action for U.S. Appl. No. 09/322,351 mailed Nov. 30, 2006, 26 pp.
Office Action for U.S. Appl. No. 09/332,351 mailed Mar. 13, 2006, 20 pp.
Office Action for U.S. Appl. No. 09/332,351 mailed Nov. 19, 2004, 22 pp.
Office Action for U.S. Appl. No. 09/332,351 mailed Jan. 27, 2003, 28 pp.
Office Action for U.S. Appl. No. 09/332,351 mailed Sep. 25, 2001, 22 pp.
Office Action for U.S. Appl. No. 09/332,351 mailed Oct. 12, 2000, 34 pp.
PCT International Search Report PCT/US00/18474 mailed Jun. 18, 2001, 4 pp.
International Search Report for PCT Application No. PCT/US99/21720 mailed Mar. 23, 2000, 6 pp.
International Search Report for PCT Application No. PCT/US99/13819 mailed Oct. 21, 1999, 7 pp.
Written Opinion for PCT Application No. PCT/US99/13819 mailed May 16, 2000, 6 pp.
International Search Report for PCT Application No. PCT/US99/13409 mailed Oct. 21, 1999, 5 pp.
Written Opinion for PCT Application No. PCT/US99/13409 mailed May 16, 2000, 9 pp.
Tedesco, Richard "Pactel pushed 'Net access." Broadcasting & Cable, Jun. 3, 1996, 2 pp.
Colman, Price "Cross-marketing cuts cable bills." Broadcasting & Cable, Jul. 15, 1996, 1 pg.
Fleming et al. "European Banks, Insurance Firms Cross Into Each Other's Territory." Wall Street Journal. (Europe) Feb. 20, 1991, 1 pg.
Office Action for U.S. Appl. No. 09/219,267 mailed Mar. 10 2009, 15 pp.
Office Action for U.S. Appl. No. 09/219,267 mailed Jan. 5, 2010, 15 pp.
Office Action for U.S. Appl. No. 09/322,351 mailed Aug. 4, 2009, 20 pp.
Office Action for U.S. Appl. No. 09/322,351 mailed Apr. 17, 2008, 19 pp.
Notice of Allowance for U.S. Appl. No. 09/274,281 mailed Jun. 9, 2010, 5 pp.
Office Action for U.S. Appl. No. 09/274,281 mailed Feb. 20, 2009, 4 pp.
Office Action for U.S. Appl. No. 09/274,281 mailed May 5, 2008, 7 pp.
Office Action for U.S. Appl. No. 11/423,481 mailed Mar. 5, 2009, 18 pp.
Office Action for U.S. Appl. No. 11/423 481 mailed Mar. 5, 2009, 17 pp.
Affidavit of Michael D. Downs with Exhibits A-E dated Apr. 6, 2007, 19 pp.
Affidavit of Michael D. Downs with Exhibits A-C dated Apr. 6, 2007, 91 pp.
Notice of Allowance for U.S. Appl. No. 09/282,747 mailed Aug. 30, 2010, 7 pp.
Office Action for U.S. Appl. No. 09/282,747 mailed Dec. 10, 2009, 17 pp.
Office Action for U.S. Appl. No. 09/282,747 mailed Mar. 4, 2009, 17 pp.
Office Action for U.S. Appl. No. 09/282,747 mailed Sep. 7, 2007, 25 pp.
Office Action for U.S. Appl. No. 09/282,747 mailed Feb. 27, 2007, 23 pp.
Office Action for U.S. Appl. No. 09/282,747 mailed Dec. 7, 2004, 12 pp.
Office Action for U.S. Appl. No. 09/282,747 mailed Nov. 19, 2002, 18 pp.
Office Action for U.S. Appl. No. 09/282,747 mailed Mar. 1, 2002, 20 pp.
Office Action for U.S. Appl. No. 09/282,747 mailed May 21, 2001, 35 pp.
Office Action for U.S. Appl. No. 09/282,747 mailed Oct. 13, 2000, 35 pp.
Notice of Allowance for U.S. Appl. No. 13/559,591 mailed May 10, 2013, 12 pp.
Office Action for U.S. Appl. No. 13/559,591 dated Feb. 28, 2013, 11 pp.
"Milestone Events Making Spring History 1899-1989", download date Oct. 22, 2003, 1 pg.
Sims, Calvin, "Centel Acquiring Cellular Phone Unit", The New York Times, May 28, 1988, Section 1, 2 pp.
Butcher, Lola, "United May Pocket Windfall With Sale of Cellular Business", Kansas City Business Journal, Jun. 6, 1988, 3 pp.
Winter, Christine, "GTE to Sell Par of US Sprint Stake Deal to Shift Another 30% to Partner Untied Telecom", Chicago Tribune, Jul. 19, 1988, 2 pp.
"United Telecommunications Announces Completion of Sale", PR Newswire, Oct. 5, 1988, 2 pp.
Henze, Doug, "A Tightening in Cellular Market", Oakland Business Monthly, Aug. 1989, 6 pp.
"United Telecom halts Sprint deal as net falls", Chicago Tribune, Jul. 18, 1990, 3 pp.
Connely, Joanne, "FCC gets spectrum comments; US Federal Communications Commission investigates development of personal communications networks and radio-based technologies", Chilton's Electronic News, Jan. 28, 1991, 3 pp.
Manuta, Lou, "Should cellular be deregulated? Cellular radio telephones; Industry Overview", Cellular Marketing, Jan. 1992, 6 pp.
Rossa, James L., "Cellphones ride roller coaster; American Information Technologies Corp. to cut commission rebates to retailers", HFD—The Weekly Home Furnishings Newspaper, Feb. 3, 1992, 6 pp.
La Rossa, James Jr., "Ameritech policy stirs debate; executives weigh retailer rebates on eve of Cellular Telecommunications Industry Association Show; American Information Technologies Corp; Special CTIA Show Issue", HFD—The Weekly Home Furnishings Newspaper, Feb. 10, 1992, 3 pp.
Ziegler, Bart, "Sprint to Merge with Centel", Associated Press, May 28, 1992, 3 pp.
Marek, Sue, "The carrier/retailer love affair—still going strong? Cellular radio industry; Cover Story", Cellular Marketing, Jul. 1992, 5 pp.
"Resale Effect Debate; GAO Faults FCC on Cellular Duopoly Scheme", Communications Daily, Jul. 2, 1992, 2 pp.
Strandjord, Jeannine M., "Should you bundle 401k services? Employee Benefits", Financial Executive, Sep. 1992, 5 pp.
Brown, Bob and Wallace, Bob, "AT&T bid fro McCaw to reshape landscape; Gives dominant carrier access to rapidly evolving market and opportunity to influence, drive, change.", Network World, Nov. 9, 1992, 3 pp.

(56) References Cited

OTHER PUBLICATIONS

Avril, Tom, "Centel Confident of Victory After Vote on Sprint Merger", Dec. 2, 1992, Section: Business News, 3 pp.
Avril, Tom, "Communications; Centel Investors Vote on Sprint Merger", The Commercial Appeal, Dec. 3, 1992, 3 pp.
Oloroso Jr., Arsenio, "Centel holds its breath; Shareholders wait to see outcome of Sprint deal", Crain's Chicago Business, Dec. 7, 1992, 2 pp.
Yates, Ronald E., "Sprint-Centel merger complete despite fears", Chicago Tribune, Mar. 10, 1993, Section: Business, 3 pp.
Wenske, Paul, "Sprint's big deal", Ingram's, May 1993, 8 pp.
Gilgoff, Henry, "Cellular Wrong Signals; Better Business Bureau: phone ads mislead", Newsday, Jul. 22, 1993, 1 pg.
"Petition Criticized; Fight on CPE Unbundling for IXC Resellers Launched by Major Retailers", Communications Daily, Aug. 10, 1993, 2 pp.
"Testimony Feb. 8, 1994, John V. Roach Consumer Electronics Retailers Coalition House Energy/Telecommunications and Finance Antitrust Reform Act of 1993", Federal Document Clearing House Congressional Testimony, Feb. 8, 1994, 8 pp.
"Sprint—Company Data", Securities and Exchange Commission Form 10-Q, for the quarterly period ended Mar. 31, 1994, 4 pp.
"Form 10-K Sprint Corp—FON", Filed Mar. 15, 1994 (period Dec. 31, 1993), 8 pp.
Kraemer, Joseph S., "Local competition; Changing Ground Rules for Network Access", Business Communications Review, Sep. 1994, 10 pp.
Steward, Shawn, "Activating the masses", Cellular Business, Oct. 1994, Section: vol. 11, No. 10, 7 pp.
"Sprint—Defining the Communications Company of the Future 1994 Annual Report to Shareholders", Document Date: Dec. 31, 1994, Filing Date: Mar. 22, 1995, 36 pp.
"Inside Sprint Corporation: 1994 Competitive Market Developments", Inside Telecom, Jul. 17, 1995, 7 pp.
"Tandy Corp—Form-Type ARS", Document Date: Dec. 31, 1995, Filing Date: Apr. 10, 1996, 14 pp.
"Sprint Completes Spin-Off of It's Cellular Subsidiary", Chicago Sun-Times, Mar. 8, 1996, 2 pp.
"Securities and Exchange Commission Form 10-K/A, 360 Degrees Communications Co Cross-Reference: Sprint Cellular Co", For the fiscal year ended Dec. 31, 1995, Filing date: Apr. 16, 1996, 23 pp.
Foster, Ed, "Can mixing 'cookies' with online marketing be a recipe for heartbun?", InfoWorld, Jul. 22, 1996, 1 pg.
Press Release: "Sprint, Sprint Spectrum and Radio Shack Join Forces", New York, NY, Sep. 11, 1996, 5 pp.
Maxon, Terry, "Tandy pairs with Sprint for venture; Companies will offer expanded offering of telecommunications products, services", The Dallas Morning News, Sep. 12, 1996, 2 pp.
Hopper, Kathryn, "Tandy, Sprint to offer one-stop phone shopping", Fort Worth Star-Telegram, Sep. 12, 1996, 1 pg.
"Tandy Corporation—Quarterly Report", For the quarterly period ended Sep. 30, 1996, Filed Nov. 12, 1996, 36 pp.
Goldberg, Jeff, "Making your wireless quest easier", Point.com, copyright 1998-2000 Point.com, Inc., 7 pp.
"J. Baker Drops Y2K Claims Against Andersen Consulting", (www retailtech.com), download date: Feb. 1999, 1 pg.
"ATM Ads", CardtTrak Online, Mar. 4, 1999, (wysiwyg //main 566/ http //www cardweb com/cardtrak/news/1999/march/4a html), 1 pg.
Witsil, Frank, "Internet Providers Offer Free Computers with a Big Catch", Knight-Ridder Tribune Business News, Jul. 2, 1999, 1 pg.
Alleman, James and Cole, Larry, "The International Handbook of Telecommunications Economics, vol. III, Sprint—GTE's lost opportunity", 13 pp.
King, Suzanne and Hayes, David, "Sprint PCS has played key role in cell phone boom", Posted: Jan. 6, 2002, 10 pp.
"Examiner's Affidavit", Affidavit of USPTO Primary Examiner James W. Myhre, Apr. 11, 2003, 1 pg.
Website: "Sprint 1995 Annual Report—Notes to Consolidated Financial Statements", (http //www sprint com/sprint/annual/95/finance/p_52a html), download date Oct. 21, 2003, 1 pg.

Website: "Sprint/History", (http www sprint com/sprint/ir/sd/timeline_02 html), download date: Jul. 27, 2004, 2 pp.
Website: "Surviving the Great Depression", (http //www geocities com/Athens/Column/4735/clbrown2 html), download date: Nov. 13, 2003, 2 pp.
Website: "The Mobile: 20 Years Young", (http: //motoinfo Motorola com/motoinfo/$20^{th}$_anniversary/docs/timeline pdf), download date: Jan. 9, 2004, 2 pp.
Website: "Qualcomm About Qualcomm—History / Key Milestones", (http www qualcomm com/about/history/ html), download date: Jul. 27, 2004, 5 pp.
Website: "Apollo Host Computer", (http //www Apollo com), undated, 4 pp.
"Introducing the Digital MenuBoard", Siren Technologies, Inc., (www sirentech com), undated, 3 pp.
"Profit and Margin Control—Features and Benefits", Multi-Point Computing Solutions, undated, 2 pp.
Brochure: "Reaching Out in New Directions", Fist Data Corporation, Merchant Services, undated, 30 pp.
Website: "The Sabre Group—Sabre Decision Technologies", (http www sdt com), undated.
Samuelson, Paul A., "Economics, Ninth Edition", McGraw-Hill Book Company, 1973, 10 pp.
"Cape Town", Reuters, Nov. 8, 1979, 1 pg.
"Save the Mark", Financial Times London, Feb. 1, 1983, Section: Section I, Men & Matters, 1 pg.
Cook, Louise, "ConsumerWatch: Clip, Snip, Save", Associated Press, Mar. 12, 1984, Section: Business News, 2 pp.
Greene, Jan, "Farm bills please assn; National Grocers Association", Supermarket News, Dec. 23, 1985, 1 pg.
Lacher, Lisa, "Coupon Gimmick Registers Profits", Business Record, Dec. 7, 1987, 2 pp.
Stevens, Lawrence, "Hypermarket challenge", Computerworld, Dec. 10, 1988, 2 pp.
"POS spectrum: a lottery looks to POS for growth", POS News, Jan. 1989, Section: vol. 5, No. 7, 1 pg.
Kuttner, Robert, "Computers May Turn the World Into One Big Commodities Pit", Business Week, Sep. 11, 1989, 2 pp.
Golden, Fran, "AAL's Riga doubts Marketel's appeal to retailers; Chris Riga of American Airlines", Travel Weekly, Nov. 13, 1989, 2 pp.
Schrage, Michael, "An Experiment in Economic Theory; Labs Test Real Markets", The Record, Nov. 26, 1989, 3 pp.
"Safeway Introduces Store-Generated Coupons", PR Newswire, May 1, 1990, 1 pg.
Ritter, Jeffrey, "Scope of the Uniform Commercial Code: Computer Contracting Cases and Electronic Commercial Practices", The Business Lawyer, Aug. 1990, 20 pp.
"Let's Play the Cash Register Receipts Lottery", The New York Times, Dec. 25, 1990, 1 pg.
Del Rosso, Laura, "Marketel says it plans to launch air fare 'auction' in Jun.; Marketel International", 3 pp.
"Philips offers customers financing through Citicorp; Philips Medical Systems North America, Citicorp North America Inc." Health Industry Today, Jun. 1991, 1 pg.
Pelline, Jeff, "Travelers Bidding on Airline Tickets SF firm offers chance for cut-rate fares", The San Francisco Chronicle, Aug. 19, 1991, 4 pp.
Blattberg, Robert C., "Interactive marketing; exploiting the age of addressability", Sloan Management Review, Sep. 22, 1991, 15 pp.
Del Rosso, Laura, "Ticket-bidding firm closes its doors; Marketel International", Travel Weekly, Mar. 12, 1992, 3 pp.
"Coupons get serious; supermarkets use barcodes to prevent misredemptions", Chain Store Age Executive with Shopping Center Age, Oct. 1992, 2 pp.
"Winn-Dixie/The Salvation Army Report Contributions for War Against Hunger", PR Newswire, Jun. 10, 1993, 1 pg.
McDowell, Bill, "Frequency marketing builds repeat business; Management", Building Supply Home Centers, Aug. 1993, 5 pp.
News Release:, "Chemical Bank and AT&T Smart Cards form strategic alliance", (http //www att com/press/1193/93117 blb htm), Nov. 17, 1993, 3 pp.

(56) References Cited

OTHER PUBLICATIONS

Kristof, Kathy, "Card Sharks are in Season; Be Wary of Discounts and Rebates as You Shop Around for Good Credit Deals", Chicago Tribune, Nov. 23, 1993, 2 pp.
Speidel, Richard, "Impact of Electronic Contracting on Contract Formation Under Revised UCC Article 2, Sales", The American Law Institute—ABA Course of Study, Dec. 9, 1993, 4 pp.
Website: "MasterCard—The Smart Card: News & Views, Using Smart Cards to Deliver New Value", (http //www mastercard com/ourcards/smartcard/articles/article4 html), Copyright 1994, 5 pp.
Spoor, Dana L., "Selling a free phone", Cellular Business, Feb. 1994, vol. 11, No. 2, 5 pp.
Jones, Jeanne, "Data Readers Streamline Management . . . ", The Houston Post, Jun. 26, 1994, 1 pg.
Fiorini, Phillip, "No Place for Penny?", USA Today, Jul. 29, 1994, 3 pp.
Smith, Alison, "Survey of UK Consumer Credit and Asset Finance", Financial Times, Nov. 3, 1994, 5 pp.
News Release: Linnen, Herb et at "AT&T comments on new FCC rules to curb 'slamming'", Jun. 14, 1995, 4 pp.
Andreoli, Tom et al., "Cash Machines Offer a Whole Lotto Money . . . ", Crain's Chicago Business, Jun. 19, 1995, 2 pp.
Knippenberg, Jim, "Will local radio empires strike back?", The Cincinnati Enquirer, Jul. 23, 1995, 1 pg.
"Cardbriefs: Stored-Value Card Designed for Casinos", The American Banker, Oct. 31, 1995, Section: Credit/Debit/ATMS, 1 pg.
Website: "Cathay Pacific Online Ticket Bidding" World Internet News Digest, copyright 1996, 1 pg.
"Cyberbid", Net Fun Ltd., Copyright 1996, 9 pp.
"Tecmark Reward Terminal", (http //www tecmarkinc com/terminal htm), copyright, 1996 Tecmark Services, Inc, 1 pg.
"Draft—Uniform Commercial Code Revised Article 2. Sales—Parts 2,3, and 7", The American Law Institute, Jan. 4, 1996, 23 pp.
Sabatini, Patricia, "Card sharks; Lurking in the sea of offers you get from credit card companies are some nasty surprises. Unless you read the fine print, you'll be in the companies' jaws before you know it.", Pittsburgh Post-Gazette, Feb. 4, 1996, 8 pp.
McKinney, Jeff, "Merchant program could pay off for provident", The Cincinnati Enquirer, Mar. 24, 1996, 2 pp.
Website: "Rate Hunter", (http //207.49.64.77/rhprodrh htm), download date: Jul. 14, 1996, 2 pp.
Hadley, Kimberly, "Pastors praying anti-arson effort will burn bias", The Nashville Banner, Jul. 26, 1996, 1 pg.
Nishimoto, Lisa, "Market Analysis; Travel services are first online commerce offerings to fly; Many corporations arrange flight, car rental, and hotel bookings on the Internet", Infoworld, Jul. 29, 1996, 2 pp.
Gapper, John, "NatWest reports rise in bad debt", Financial Times, Jul. 31, 1996, Section: News, UK, 1 pg.
Website: "Welcome to the American Airlines Internet Silent Auction", American Airlines, Inc., (http //www Americanair com), download date: Aug. 1996, 8 pp.
Website: "Crest—Cruise/Ferry Revenue Management System", (http www rtscorp com/h2o htm), download date: Aug. 5, 1996, 5 pp.
Wagner, Jim, "Cameras Tell Mall What Door You Use, How Often You Go", Albuquerque Tribune, Aug. 9, 1996, 2 pp.
"Lynx Technology: Lynx to provide business leasing programme through Schroder Leasing", M2 Presswire, Aug. 9, 1996, 2 pp.
Press Release of Aug. 21, 1996, "Fort Worth Outlet Square Offers American Airlines Aadvantage Miles", Tandy Corporation, (http //web archive org/web/19971022162925/www tandy com/press/fwos-AA), 2 pp.
Taylor, Paul, "Towards a dream market", Financial Times, Sep. 4, 1996, Section: Survey—FT IT 2 pp.
Press Release of Sep. 11, 1996, "One-Stop Telephone Shopping Returns to America! Sprint, Spring Spectrum and Radioshack Join Forces", Tandy Corporation, (http //web archive org/web/19971022163159/www tandy com/press/sprinton), 2 pp.

Fickenscher, Lisa, "Amex to Start Free Rewards Program with Discounts on Merchandise", The American Banker, Oct. 18, 1996, Section: Credit/Debit/ATMS, 2 pp.
Fitzgerald, Kate, "Amex program moves loyalty to next level: Custom Extras finds a medium customers can't ignore: Billing Statements", Advertising Age, Nov. 4, 1996, 2 pp.
"World's First Real-Time Travel Auction Service to be Available Via World Wide Web; ETA to Open Bidding to Consumers, Travel Industry; Web Auction Leader eBay to Provide Technology Support", Business Wire, Nov. 4, 1996, 2 pp.
Website: "Web Ventures presents Bookit!", (http //www webventures com/bookit), download date: Dec. 2, 1996, 1 pg.
Nimmer, Raymond T., "Commercial Transactions on the Global Information Infrastructure: Electronic Contracting: Legal Issues", The John Marshall Journal of Computer Information Law, 14 J. Marshall J. Computer & Info. L. 211, Winter 1996, 26 pp.
Bonnici, Joseph et al., "Consumer issues in coupon usage: An exploratory analysis", Journal of Applied Business Research, winter 1996/1997, 13 pp.
"Happy Anniversary here's your Cashback Bonus ® Award", Private Issue by Discover, Copyright 1997, 3 pp.
Website: "buy.com", (wysiwyg//29http//www buy com/retail/w.. Category=CELLULAR&Keyword=cellular+), copyright 1997-2003, 2 pp.
Rehayem, Gilbert, "Opinion: X-Press Betting", La Fleur's Lottery World, Feb. 7, 1997, 1 pg.
"UK's World Telecom Unveils New WorldSaver Tariffs", Newsbytes, Feb. 13, 1997, 1 pg.
Singletary, Michelle, "Electronic World, Unchecked Problem?", The Washington Post, Mar. 4, 1997, 4 pp.
Fickenscher, Lisa, "Merchant: American Express Seeks to Mine Its Data on Cardholder Spending Patters", The American Banker, Mar. 24, 1997, Credit/Debit/ATMSs, 2 pp.
Kelsey, John et al., "Conditional Purchase Orders", Fourth ACM Conference on Computers, Apr. 1997, 8 pp.
Bryant, Adam, "Shaking Up Air Fares' Status Quo; Entrepreneur Seeks Break for Last-Minute Business Fliers", The New York Times, Apr. 1, 1997, 4 pp.
"Dispensing the future", Electronic Payments International, May 1997, 5 pp.
Website: "Frequently Asked Questions about: AIRHITCH", (http //www isicom fr/airhitch/ahfaq), download date: May 6, 1997, 5 pp.
"Products and Services, Checkout Direct", Catalina Marketing Corporation, (http //catalinamktg com/prodcdir htm), download date: May 29, 1997, 16 pp.
"Industry Briefs", Card News, Jun. 9, 1997, 2 pp.
Riordan, Teresa, "Patents; A novel approach to making a better spermicide harks back to some old-fashioned methods.", The New York Times, Jun. 9, 1997, 2 pp.
"Internet mortgage service eliminates loan agents and passes commissions on to the consumer", Business Wire, Jun. 30, 1997, 2 pp.
Nairn, Geoff, "The key to your identity: Falling costs will allow fingerprint verification to be widely used", Financial Times (London), Jul. 15, 1997, 3 pp.
"The United Computer Exchange: How it All Works", The Untied Computer Exchange Corporation, (www uce com/howitworks html), download date Jul. 23, 1997. 6 pp.
"Classifieds2000 the Internet Classifieds", (http www classifieds2000 com/cgi-cls/Display exe?C2K+aboutus), download date: Aug. 6, 1997, 3 pp.
Brochure: "Tired of Shopping for the Best Home Loan?", Mortgage Loan Specialists, Aug. 7, 1997, 2 pp.
Trading floor.com General Trading Information, Aug. 14, 1997, 11 pp.
"Switch your Chase MasterCard to a Shell MasterCard from Chase and you'll earn: Free Formula Shell Gasoline", Chase Manhattan Bank USA, N.A., Sep. 1997, 2 pp.
"Case-in-POINT: Case Study: Bloomingdale's, Inc.", (http www acxiom comcip-cs-b htm), download date: Sep. 23, 1997, 2 pp.
Website: "NCR 7452 Workstation—Beyond Traditional POS", (http //www ncr com/product/retail/products/catalog/7452 shtml), download date: Sep. 23, 1997, 3 pp.

(56) References Cited

OTHER PUBLICATIONS

"NCR 7453 PC-Based Point-of-Sale Solution", NCR Corporation, Copyright 1998, 2 pp.
Brochure: "OpenSite Technologies, Inc.", copyright 1998, 8 pp.
"For the Crew & the Customer", Olivetti, Winter, 1998, 2 pp.
Krauss, Jeffrey, "Subsidized TV sets?", CED (Communications Engineering & Design), Feb. 1998, 3 pp.
Goldblatt, Henry, "AT&T Finally Has an Operator . . . ", Fortune, Feb. 16, 1998, Section: Features/Telcos, 4 pp.
"New Partners, more exciting rewards: The Membership Rewards program for 1998", (http //www americanexpress com/rewards/news/docs/1998new_mr shtml), download date: Mar. 12, 1998, 38 pp.
Elstrom, Peter, "Reach Out and Pay Someone", Business Week, Mar. 23, 1998, 1 pg.
"Cross-Sell Billing Statement Acquisition System", Apr. 7-9, 1998, 2 pp.
Hemsley, Steve, "Research and Destroy . . . ", Marketing Week, Apr. 16, 1998, Section: Point of Purchase, 3 pp.
Website: "MCI Freeflix Free Video Rental Program", (http //www mci com/aboutus/products/prepaid/promotional shtm), download date: Apr. 21, 1998. 1 pg.
Website: "MCI PrePaid Card Retail Promotional Opportunities", (http //www mci com/aboutus/products/glossary/home/freeflix shtml), download date: Apr. 21, 1998, 2 pp.
Website: "Wall Street Access . . . : Active Trader Rebate Program", (http //www wsaccess com/active_rebate_program htm), download date: Apr. 22, 1998, 2 pp.
Website: "Collector's Super Mall Information", (http //www csmonline com/help/aboutcsm html), download date: Apr. 23, 1998, 4 pp.
Amato-McCoy, Deena, "Co-Branded Acme Credit Card Rewards Loyal Users" Supermarket News, Jun. 15, 1998, 2 pp.
"Acme Markets, U.S. Bankcorp Debut Visa Rewards Card", Card News, Jun. 22, 1998, 1 pg.
Rubenstein, Ed, "Prepaid program lets Galleria guests dine a la Card", Nations Restaurant News, Jun. 29, 1998, 1 pg.
"DataCard Partners With CSI to Offer Card-Based Loyalty Solution to Merchants", Business Wire, Jul. 9, 1998, 1 pg.
Albright, Mark, "Grocery savings via Web coupons", St. Petersburg Times, Jul. 22, 1998, 2 pp.
Website: "DealDeal com—The Best Auction Deals on the . . . ; Bid to Win", (http www dealdeal com/pxfm/bidandwin cfm?classID=elc &cid=&cal=), download date: Oct. 29, 1998, 2 pp.
Fitzgerald, Kate, "Dual-function Cards Latest Pitch to Call in Holders", Card Marketing, Nov. 1998, vol. 2, No. 10, (http //cardmarketing faulknergray corn), 2 pp.
"Planet U—making promotional offers available to U", (http //www planetu com/Pages/con-index html), download date: May 23, 1999, 1 pg.
Schoch, Eric B., "Indianapolis Best Buy Stores to Launch Computer, Internet Discount Packages", Knight-Ridder Tribune Business News, Jun. 30, 1999, 1 pg.
"Best Buy Makes PC/Internet Offer Easier & Instant", PR Newswire, Jul. 26, 1999, 1 pg.
"IAFC Launches NextCard(sm)—The First True Internet VISA", (http //www nextcard com/release1 html), download date: Sep. 14, 1999, 2 pp.
Prodigy Agreement, Aug. 6, 1999, 1 pg.
"IAFC Launches NextCard(sm)—The First True Internet VISA", (http //www nextcard com/release1 html), download date: Sep. 14, 1999, 5 pp.
Goldberg, Jeff, "Cellular phone information from Point.com", (http www point com/articles/489 asp), download date: Nov. 16, 2000, 2 pp.
Website: "Verizon Wireless at Radio Shack", (http //www radioshack com/Partners/Verizon/VerizonLanding asp?ln=ve), Copyright 2003, 3 pp.
PCT International Search Report for Application No. PCT/US99/13819, mailed Oct. 21, 1999, 8 pp.

PCT International Preliminary Examination Report for Application No. PCT/US00/1847 dated Jun. 18, 2001, 4 pp.
Website: "The Loan Process", Mortgage Loan Specialists, (http //web archive org/web/1970715200608/http //www sdtech com/mls/process html), download date: Sep. 30, 2003, 3 pp.
Website: "Phonemiser: Frequently Asked Questions", (http //web archive org/web/19970601100142/http //www phonemiser com/faq htm), download date: Sep. 30, 2003, 8 pp.
Website: "Welcome to Sotheby's", (http //web archive org/web/19970101034054/http www sothebys corn/), download date: Sep. 30, 2003, 2 pp.
Website: "Welcome to Trade-direct", (http //web archive org/web/19970212130834/http //www trade-direct com/), download date: Sep. 30, 2003, 2 pp.
Declaration of Dean Alderucci with Exhibits, Oct. 22, 2003, 25 pp.
Website: "Airhitch Your Way to Low Cost Travel!", (http //web archive org/web/19970416104620/http //www vaportrails com/Budget/BudFeatures/Airhitch/A...), download date: Nov. 7, 2003, 2 pp.
Carroll, Richard, "TravelASSIST Magazine—Travel Deals—Hitch a Flight to Europe", (http //web archive org/web/19970118210259/http //www travelassist com/mag/a69 html), download date: Nov. 7, 2003, 1 pg.
Ross, Chuck et al., "Coke Card promotion set for '98", (http //web archive org/web/19980116055228/http //adage com/news_and_feaures/feature . . . ), download date: Nov. 14, 2003, 2 pp.
Pogoda, Dianne M., "G.E.C.C. Offers Credit Card with Discounts, Rebates; General Electric Capital Corp." WWD (Woman's Wear Daily) Sep. 3, 1992, 2 pp.
Schrage, Michael. "Free Stuff! Predatory Pricing or creative cross-promotion?", Marketing Computers, Oct. 1995, 2 pp.
Merger Creates Alliance Data, Credit Risk Management Report, Dec. 16, 1996, 1 pg.
Marshall, Kyle, "More phone choices ring in", The News and Observer, Aug. 13, 1996, 2 pp.
Booker, Ellis, "Checkout Lines to Offer More Than Just Candy and Waiting", Computerworld, PC's & Workstations, May 21, 1990, 1 pg.
Shaw, Robert, "How the Smart Card is Changing Retailing", Long Range Planning, 1991, 4 pp.
Rosenberg, Joyce M. "GE Capital Comes to Macy's aid Again", AP Worldstream Feb. 17, 1994, 2 pp.
Higgins, Stephen "Digital Phone Service on the Way" Business Dateline; New Haven Register, Jan. 7, 1997, 3 pp.
Kerstetter, Jim "E-Commerce Updates Get Intelligent Agents; Electronic Commerce", PC Week Feb. 3, 1997, 2 pp.
Barlow, Rick "Relationship Marketing: Coalition Marketing is Coming Back", Brandweek, Apr. 28, 1997, 2 pp.
Simon, Ruth "Make Sure Your Rebate Card Still Delivers the Goods", Money Aug. 1997, 2 pp.
Gilligan, Gregory J. "Credit Cards from Retail Store's a Mixed Blessing for Shoppers", The Richmond Times Dispatch, Jul. 20, 1997, 4 pp.
Sanders, Edmund "Tricky Business; The Magic of Rebate Cards can Quickly Disappear", Chicago Tribune Aug. 18, 1997, 3 pp.
Wijnen, Renee "Cendant Eyes Cross-Marketing Opportunities; CUC International-HFS Inc. Merger Expected to Yield an Additional 2 Million Club Members" DM News Feb. 2, 1998, 2 pp.
"Cardholders Think Big" Bank Marketing International Mar. 1998, 3 pp.
Wald, Matthew L. "Spending It; Untying Cellular Phones From Those Annual Contracts" The New York Times Mar. 15, 1998, 2 pp.
"American Eagle Outfitters, Inc. Introduces the First Clear Credit Card" PR Newswire Mar. 26, 1998, 2 pp.
Ling, The Hooi "Prices of Handphones Dive, Thanks to Cross-Subsidies" Business Times, Apr. 8, 1998, 2 pp.
"Card Briefs: Beneficial, Casual Male Team Up on Card" The American Banker May 4, 1998 1 pg.
"Points Earn Little Credit as Cardholders Fail to Cash In" Birmingham Post May 9, 1998, 2 pp.
Meece, Mickey "Big Finance Companies May Want Piece of Limited's Private-Label Card Program", The American Banker Apr. 12, 1995, 2 pp.

(56) References Cited

OTHER PUBLICATIONS

"Jay Jacobs Inc. Introduces Private Label Credit Card", Business Wire May 18, 1998, 1 pg.
"Wellsparks Group Launches V.I.P. Rewards; The Most Comprehensive Relationship Marketing Program Ever Created by a Mall Developer", Business Wire, May 19, 1998, 2 pp.
"SNET Cellular Value Plans" Brochure, Jun. 12, 1998, 3 pp.
"Shoppers Charge Accounts Co. to Administer Private Label Credit Card for Lew Magram Ltd; Program Marks SCA,s Entry into Retail Catalog/Mail Order Industry" PR Newswire Jun. 29, 1998, 6 pp.
"Cell Phones at 7-11? Almost Everyone is Selling Wireless Service these Days. Here's How to Get the Right Deal" Time Magazine Jul. 6, 1998, 2 pp.
"The Savings Game: Read Fine Print in Rebate Offers by Credit Cards" The Cincinnati Enquirer Aug. 31, 1998, 3 pp.
"Wal-Mart on Retail Road Less Traveled: Cobranding," The American Banker Sep. 11, 1998, 3 pp.
Elkin, Tobi "Promotions: Mastercard Wins Coveted On-Pack Real Estate in Tie-in with Microsoft" Brandweek Sep. 14, 1998, 1 pg.
"Clubmacy's" Brochure Sep. 1998, 2 pp.
"Filene's" Credit Card Application, Sep. 1998, 2 pp.
"Dual-Function Cards Latest pitch to Call in Holders" Card Marketing, Nov. 1998, 2 pp.
"Issuers Charge Ahead to Focus on Price Vs. Brand", Card Marketing, Nov. 1998, 2 pp.
"Competition: First USA, with its Microsoft Pact, is King of the Internet", Credit Card News Nov. 1, 1998, 2 pp.
"Retail Cards: Attention Kmart Card Holders: 6% Back is Dead a New package of Perks is Coming" Credit Card News Nov. 1, 1998, 1 pg.
"Microsoft and First USA Announces $90 Million Online Advertising Alliance" EDP Weekly's IT Monitor Nov. 2, 1998, 2 pp.
Feldman, Amy "Paying with Plastic Not Such a Smart Idea", New York Daily News Nov. 4, 1998, 2 pp.
Cowell, Alan "America's Turn to Colonize; Creditcard Issuers Invade Britain, with U.S. Firepower", The New York Times Nov. 12, 1998, 5 pp.
"No. 1 Online Department Store Joins Clickrewards" PR Newswire Nov. 27, 1998, 3 pp.
Shermach, Kelly "Partnerships Help Issuers Web Concepts", Card Marketing, Dec. 1998, 2 pp.
"Largest Internet Ad Deal Signed", Bank Marketing International, Dec. 1998, 3 pp.
"Amazon.com and Netflix.com Establish Promotional Relationship for the Sale and Rental of DVD Titles" Business Wire, Dec. 4, 1998, 3 pp.
"At Sports Superstore Online, Shoppers Get More for Their Money; 10,000 Reasons to Shop at Sports Superstore Online", Business Wire Dec. 4, 1998, 2 pp.
"Credit Card Enticements" NPR Morning Edition, Dec. 23, 1998, 3 pp.
"Pagers That Can Spell It All Out", Business Week, Jan. 16, 1995, 2 pp.
Block, Valerie "GM Turns Up the Heat with Plan to Cross-sell some Financial Products," The American Banker Nov. 18, 1994, 2 pp.
Fitzgerald, Beth "New Jersey-Based SCA helps Private Label Credit Cards Take Off", The Star-Ledger, Aug. 4, 1997, 2 pp.
Notice of Allowance for U.S. Appl. No. 12/938,025 mailed Feb. 16, 2012, 8 pp.
Office Action for U.S. Appl. No. 12/938,025 mailed Jan. 13, 2012, 6 pp.
Office Action for U.S. Appl. No. 12/938,025 mailed Apr. 22, 2011, 12 pp.
PCT International Search Report for International Application No. PCT/US99/13409 mailed Oct. 21, 1999, 2 pp.
Website: "The Saber Group: Welcome to Sabre Decision Technologies," downloaded from http//www.sdt.com, undated, 6 pp.
Schrage, Michael. "An Experiment in Economic Theory; Labs Testing Real Markets," The Record, Business section, p. B01, Nov. 26, 1989, 3 pp.

Website: "HomeShark Refinance Check," HomeShark, Inc., Homepage: www.homeshark.com/homewatch/refi/refistep_1.htm, download date: Aug. 31, 1997, 6 pp.
Website: "Tradingfloor.com," Homepage: www.tradingfloor.com/info/htm, download date; Aug. 14, 1997, 11 pp.
Website: The NASDAQ Market, Inc. ("NASDAQ") Consolidated subscriber Agreement, Homepage: www.pcquote.com/exchange/ex_nasd.html, download date: Aug. 15, 1997, 5 pp.
Website: "What is NASDAQ?" Homepage: http://home/axford.com/corfin/cof11.htm, download date: Aug. 15, 1997, 3 pp.
Website: "Onsale® Auction Supersite (TM)," OnSale, Inc., Homepage: www.onsale.com/category, download date: Sep. 8, 1997, 15 pp.
Website: "About IAO (Interactive Auction Online)," Interactive Auction Online, Homepage: www.iaoauction.com/auction.htm, download date: Sep. 18, 1997, 10 pp.
Hoeschen, Brad. "Brookfield Square Hopes Mall Card Strikes a Chord," Business Journal-Milwaukee, vol. 14, No. 50, p. 19, Sep. 12, 1997, 2 pp.
Website: "Case-In-Point: Bloomindale's Inc.," Acxiom, Conway, AR., Homepage: www.acxiom.com/cip-cs-b.htm, download date: Sep. 23, 1997, 3 pp.
Brochure: "MyPoints (R)", MotivationNet, Inc. (TM), Homepage: www.mypoints.com, Copyright: Apr. 1998, 29 pp.
Hemsley, Steve. "Research and Destroy; Point-of Purchase Research Provides Brand Managers with Essential Information About Customers Trends and Enables Them to Achieve the Maximum Impact From Their Displays," Marketing week, Point of Purchase, Apr. 16, 1998, 3 pp.
Nimmer, Raymond T., "Electronic Contracting: Legal issues," 14 J. Marshall Computer & Infor. L. 211, Winter 1996, 25 pp.
American Law Institute, Draft-Uniform Commercial Code Article 2 (Sales), parts 2,3, and 7, Jan. 4, 1996, 24 pp.
Website: "Phonemiser," downloaded from http://www.phonemiser.com/faq/htm, Jul. 14, 1996, 8 pp.
Nishimoto, Lisa, "Market Analysis: Travel Services are First Online Commerce Offerings to Fly: Many Corporations Arrange Flight, Car Rental and Hotel Bookings on the Internet," InfoWorld, p. 44, Jul. 29, 1996, 2 pp.
Website: "Cathy Pacific: Cybertraveler auction #3—Official Rules," downloaded from http://www.cathypacific, downloaded Jul. 30, 1996, 4 pp.
Website: American Airlines Internet silent Auction, American Airlines, Inc, downloaded from http://www.Americanair.com Aug. 1996, 8 pp.
Website: "Crest: Cruise/Ferry Revenue Management System," Revenue Technology services Corporation, downloaded from http://www.rtscorp.com/h2o.htm, Aug. 5, 1996, 5 pp.
"World's First Real-Time Travel Auction Service to be Available Via World Wide Web," Business Wire, Nov. 4, 1996, 2 pp.
Website: "Web Ventures Presents Bookit!," downloaded from http://www.webventure.com/bookit/, Dec. 2, 1996, 2 pp.
Website: Hitch a Flight to Europe, downloaded from http://www.travelassist.com/mag/a69.html, May 6, 1997, 1 pg.
Website: "Trade-Direct: We Help You Trade with Confidence," downloaded from http://www.trade-direct.com/, Aug. 6, 1997, 2 pp.
Opensite Technologies, Inc., Brochure copyright date 1998, 8 pp.
Website: "CSM Online: Collector's Super CSM Mall," downloaded from http://www.csmonline.com/help/aboutcsm.html Apr. 23, 1998, 4 pp.
Website: "Netis: Auction Web," downloaded from http://www.auctionweb.com Oct. 13, 1998, 9 pp.
Website: "DealDeal>com:Bid to Win," downloaded from http://dealdeal.com/pxcfm/bidandwin.cfm?classID=elc&cid=&cal, Oct. 29, 1998, 2 pp.
Mandesse, Joe, "Interactive Puts Radio at Crossroads; Out-of Home Role, Tapping into Digital Tech Could Ensure Future," Advertising Age, News, Oct. 25, 1993 at p. 12, 4 pp.
Ellis, Stephen, "Credit Card firms Drive Down Costs," Sunday Times Features section, Feb. 27, 1994, 4 pp.
Patch, Kimberly, "Sled InterNIC Debut Internet Services; Sled Corp Offers Electronic Coupons for Encryption software; InteNIC Information Services Launches InfoGuide to Internet Computer Network" PC Week, May 16, 1994, 1 pg.

(56) References Cited

OTHER PUBLICATIONS

Ratcliffe, Mitch, "Lucie; Interactive Environment," Information, Advertising stands Upright, Prepares to Walk; Information Presentation Technologies Inc.'s Local Use consumer Interactive Environment, Digital Media, Jun. 8, 1994, No. 1, vol. 4 at p. 14, ISSN: 1056-7038, 4 pp.
Armstrong, Larry. "Coupon Clippers, save Your Scissors," Vons Supermarkets are Revolutionizing the Delivery of Discounts. Business week, Jun. 20, 1994, No. 3377 at p. 164, 2 pp.
Bowles, Bob and Andreasen, Lois, "ADSI: Maximizing the Synergy Between the Network and Terminals; Analog display Services Interface," Telephony, Aug. 19, 1994, vol. 227, No. 9 at pg. 20, ISSN: 0040-2656, 4 pp.
Radccliffe, Mitch. "All Roads Lead to Microsoft's Windows Everywhere Strategy," Digital Media, Mar. 6, 1995, No. 10, vol. 4 at p. 3, ISSN: 1056-7038, 11 pp.
Nolle, Tom, "Overcoming Cellular Déjà vu; Personal Communications Services," America's Network, Sep. 15, 1996, No. 18, vol. 100, 1 pg.
Meece, Mickey. "Mastercard, Retailers Testing Point of Sales Discounts Program"; Credit/Debit/ATMS, Sep. 24, 1996 1 pg.
Battle of the Bogoff: Roderick Oram on a Clash between Retailers and Manufacturers, Financial times (London), Management, Marketing and Advertising, Oct. 24, 1996, 2 pp.
"AT&T Wireless Adds Convenience to Buying Cellular services," M2 Communications Ltd. 1996; M2 Presswire, Pittsburgh, Nov. 20, 1996, 2 pp.
Beyer, Leslie. Target Marketing Made Easy; Supermarkets, Delta Communications Inc., Grocery Marketing, Feb. 1997, 3 pp.
"Emaginet Plans to Push Its Way into Consumer Mindset Pocketbook," Interactive PR and Marketing News, May 30, 1997, 2 pp.
Warner, Bernhard. "Ads in the Ether on PC's Phones, Pagers (Will Consumers Accept Promo Beeps?)," Brandweek, Mar. 31, 1997 at p. 48, 3 pp.
Sinclair, Stewart. "To Mail or Not to Mail?" Strategy, Strategy Directresponse Special Report, Couponing, Oct. 12, 1998 at p. D21, 4 pp.
Dennis Sylvia. "Visa Gets ready for Interactive Set-Top Boxes," Newsbytes, Dec. 14, 1998, 2 pp.
Shermach, Kelly. "Retailers Rebuild Roots As Loyalty Pioneers," Card Marketing, Jan. 1999, vol. 3, No. 1, 2 pp.
"Northwest Airlines, Sprint Enter into Mileage Partnership; Consumers can Earn Up to 16,500 Frequent Flyer Miles Through Wide Range of Communications Services—Long Distance, Internet, Paging and Ultimately Sprint PCS," PR Newswire, Financial News, Jan. 5, 1999, 2 pp.
Free from NextCard—The Ages of Myst(TM), NextCard Promotion. (http://www.nextcard.com/ages/agesofmyst.html), download date: Jan. 6, 1999, 2 pp.
"E—Card web Page," E—Commerce Services from First USA, (http://apl.firstusa.com/pcard/index1.cfm?), download date: Jan. 11, 1999, 5 pp.
"About SaveSmart," SaveSmart.com, (http://www.savesmart.com/about/savesmart.html), down date: Jan. 12, 1999, 4 pp.
Internet/News.com staff, "The Trip.com, Visa Launch Rewards Program," (http://www.internetnews.com/ec-news/1999/01/1302-trip.html), download date: Jan. 13, 1999,2 pp.
"MySimon," my-Simon.com fact Sheet, (http://www.mysimon.com/corporate/company/factsheet.html), download date Jan. 13, 1999, 3 pp.
About ClickRewards the Best way to Earn Miles, (http://www.clickrewards.com/about.html), download date: Jan. 13, 1999, 4 pp.
"Join AOL Long Distance and This Is What You Will Receive . . . ," Jan. 13, 1999, 2 pp.
"FYI; Calls Are Free After the Ads," Star Tribune, Jan. 14, 1999, 1 pg.
"The New AE Card," American Eagle Outfitters Credit Application, Jan. 14, 1999, 6 pp.
"Alta Vista's special Offer to You . . . $10 for Any CD!," Jan. 17, 1999, 1 pg.
"Amazia Endeavour Travel," TS60 Eight Day Fly Drive Package, Jan. 17, 1999, 2 pp.
"Rent from NetFlix.com Buy from Amazon.com," Official Press Release, Jan. 17, 1999, 1 pg.
"Sprint Sense Anytime;" Titanic on Videocassette is free when you sign up for Sprint Sense Day Long Distance, (http://csg.sprint.com/titanic), download date: Jan. 18, 1999, 1 pg.
O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. Column 2 at pg. 1, 4 pp.
Cox, Beth, "Visa, Travelweb Enter Online Marketing Partnership," Internetnews.com, Jan. 21, 1999, 1 pg.
Ellin, Abby, "Listening to an Earful for Savings," (Hear the Pitches and talk for Free), The New York Times, Jan. 24, 1999, 1 pg.
"Kiosk Issues Cards for Loyalty and Credit: Datacard, Minneapolis, Has Introduced a Line of Kiosks that Retailers Can Use to Issue Loyalty Program Cards and In-Store Charge Cards," Rtnews Feb. 1999, 1 pg.
Files, Jennifer, "Grocers, AT&T Team Up; "Smart" Coupon to Offer Bonus," The Dallas Morning News, Business, Feb. 6, 1999, 2 pp.
Wijnen, Renee, "Listening to Ads Earns Free Long Distance; Advertisers Select Target Groups to Hear Messages," DM News, Supplement, Teleservices News, Mar. 1, 1999, 3 pp.
"Smart Cards; Buying Via Cable Lines," Future Banker, Future Money, Mar. 1, 1999 at p. 19, 1 page.
"CardTrak Online," ATM Ads, (www.cardweb.com/cardtrak/news/1999/march/4a.html), 1 pg.
"Wells Fargo ATMs in California Becomes Little Billboards," Marketing News TM, Mar. 29, 1999, 2 pp.
"$20 in Free Groceries when You switch to AT&T Residential Long Distance Service. Call 1 800 288-262 AT&T," Photocopy of a Coupon Obtained from a coupon-dispensing Machine at a Safeway store May 19, 1999, 1 pg.
"Planet U; Making Promotional Offers Available to U," (http://www.planetu/Pages/con-index.html), download date: May 23, 1999, 1 pg.
"Five Great reasons to Enroll," (http://www.coolsavings.com/scripts/why enroll.asp? . . . ), download date: May 23, 1999, 2 pp.
"E-Centives," (http://www.emaginet.com/de . . . memfaq.shtml), download date: May 23, 1999, 3 pp.
Visa—Smart Cards—About Smart cards; "What Is a smart card?," (http://www.visa.com/nt/chip/info.html), Download date: May 23, 1999, 4 pp.
"Smart Cards for Windows;" The Smart Market Opportunity, (http://www.microsoft.com/windowsce/smartcard/start/background.asp), download date: May 23, 1999, 6 pp.
"Our Cards:Smart Cards:' Using Smart Cards to deliver New Value." (http://www.mastercard/com/ourcard/smartcard/articles/artivle4.htm10, download date: May 23, 1999, 5 pp.
"deja.com," (http://x24.deja . . . /getdoc.xp? . . . ), May 24, 1999, 7 pp.
Royal Bank is First to Offer Instant Discount Program on No-Frills, Low rate Option and Classic Visa Cards: Canada News Wire; Financial News, Jul. 2, 1999, 2 pp.
Higginbotham Stacey "Next Online Bids Over Jail Time?" Business Week Jul. 19 1999, 1 pg.
Armstrong, Larry, "The Free-PC Game: Lure 'Em in and Lock 'Em Up," Business Week, Information Technology, Jul. 19, 1999, 1 pg.
Poletti Therese "Latest twist on Free PC's—Free iMacs:" Yahoo! News technology Headlines; Aug. 3, 1999, 2 pp.
Hamilton, Doug, "Florida Museum Displays Massive JFK Collection, Going Places; News, Notes & Tips," The Atlanta Journal and Constitution, Nov. 7, 1999, 3 pp.
"Multi-Pint Computing Solutions," (http://multi-point.com/au/pmc/htm), download dte: Nov. 22, 1999, 2 pp.
PCT International Search Report for International Application No. PCT/US99/19955 mailed Feb. 23 2000, 6 pp.
PCT International Written Opinion for International Application No. PCT/US99/13409 mailed May 5, 2000, 2 pp.
Miriam Kreinin Souccar. "Epidemic of Rate Shoppimg Spurs a Search for remedies," Jan. 7, 1999, American Banker, Inc., download date Sep. 14, 1999, 2 pp.
Holton Lisa "Cable Efforts Help Insurers Tune Into New Markets" Card Marketing Jan. 1999, 2 pp.

(56) References Cited

OTHER PUBLICATIONS

Shook, David, "Rebate Limits Can Be a Pain for Consumers", The Buffalo News, Jan. 1999, 2 pp.
Inside a Year of free Time from Sprint, Time Magazine, Mar. 29, 1999, 5 pp.
*Walker Digital LLC* v. *Fandango, Inc., et al*, Civil Action No. 11-cv-00313-SLR, Defendant's Joint Initial Invalidity Contentions, dated May 1, 2012, 146 pp.
Invalidity Claim Chart A-1, U.S. Patent No. 7,827,056, 37 pp.
Invalidity Claim Chart, A-2, U.S. Patent No. 7,827,056, 47 pp.
Invalidity Claim Chart, A-3, U.S. Patent No. 7,827,056, 31 pp.
Invalidity Claim Chart, A-4, U.S. Patent No. 7,827,056, 50 pp.
Invalidity Claim Chart, A-5, U.S. Patent No. 7,827,056, 39 pp.
Invalidity Claim Chart, A-6, U.S. Patent No. 7,827,056, 20 pp.
Invalidity Claim Chart, A-7, U.S. Patent No. 7,827,056, 42 pp.
Invalidity Claim Chart, A-8, U.S. Patent No. 7,827,056, 53 pp.
Invalidity Claim Chart, A-9, U.S. Patent No. 7,827,056, 36 pp.
Invalidity Claim Chart, A-10, U.S. Patent No. 7,827,056, 61 pp.
Invalidity Claim Chart, A-11, U.S. Patent No. 7,827,056, 52 pp.
Invalidity Claim Chart, A-12, U.S. Patent No. 7,827,056, 39 pp.
Invalidity Claim Chart, A-13, U.S. Patent No. 7,827,056, 61 pp.
Invalidity Claim Chart, A-14, U.S. Patent No. 7,827,056, 36 pp.
Invalidity Claim Chart, B-1, U.S. Patent No. 7,831,470, 16 pp.
Invalidity Claim Chart, B-2, U.S. Patent No. 7,831,470, 24 pp.
Invalidity Claim Chart, B-3, U.S. Patent No. 7,831,470, 14 pp.
Invalidity Claim Chart, B-4, U.S. Patent No. 7,831,470, 14 pp.
Invalidity Claim Chart, B-5, U.S. Patent No. 7,831,470, 11 pp.
Invalidity Claim Chart, B-6, U.S. Patent No. 7,831,470, 7 pp.
Invalidity Claim Chart, B-7, U.S. Patent No. 7,831,470, 21 pp.
Invalidity Claim Chart, B-8, 29 U.S. Patent No. 7,831,470, 29 pp.
Invalidity Claim Chart, B-9, U.S. Patent No. 7,831,470, 19 pp.
Invalidity Claim Chart, B-10, U.S. Patent No. 7,831,470, 22 pp.
Invalidity Claim Chart, B-11, U.S. Patent No. 7,831,470, 25 pp.
Invalidity Claim Chart, B-12, U.S. Patent No. 7,831,470, 17 pp.
Invalidity Claim Chart, B-13, U.S. Patent No. 7,831,470, 13 pp.

\* cited by examiner

| | CUSTOMER IDENTIFIER 420 | NAME 422 | BILLING ADDRESS 424 | CREDIT CARD INFORMATION 426 | E-MAIL 428 |
|---|---|---|---|---|---|
| 404 → | C0001 | DAN MANN | 123 MAIN ST. | VISA 1111-1111-1111-1111 | DMANN@ISP.COM |
| 406 → | C0002 | STEVE DAVIS | 3 RIVERPLACE ROAD | AMEX 4444-5555-6666-3333 | SDAVIS@SCHOOL.EDU |
| 408 → | C0003 | JEFF SMITH | 2 THRUSH LANE | DIS 2222-3333-4444-7777 | SMITH@WEBTV.COM |
| | C0004 | GEORGE ALAN | 15 LAUREL AVENUE | VISA 1111-4444-8888-3333 | ALAN@WORK.COM |

|  | VENDOR IDENTIFIER 520 | VENDOR NAME 522 | VENDOR E-MAIL ADDRESS 524 | AMOUNT OWED TO VENDOR 526 |
|---|---|---|---|---|
| 502 | | | | |
| 504 → | V001 | VENDOR X | X@X.COM | $0.00 |
| 506 → | V002 | VENDOR Y | Y@Y.COM | $100.00 |
| 508 → | V003 | VENDOR Z | Z@Z.COM | $987.13 |
| → | V004 | VENDOR Q | Q@Q.COM | $45.00 |

| TRANSACTION IDENTIFIER 620 | TIME OF TRANSACTION 622 | ITEMS ORDERED 624 | CREDIT CARD INFORMATION 626 | AMOUNT CHARGED 628 | DELIVERY ADDRESS 630 | CUSTOMER IDENTIFIER 632 |
|---|---|---|---|---|---|---|
| T 000 001 | 1/4/2001 8:07 AM | P038, P049, P812 | VISA 1111-1111-1111-1111 EXP. 3/2002 | $49.87 | 123 MAIN ST. TOWN, USA | NONE |
| T 000 002 | 1/9/2001 9:00 PM | P123 | MASTERCARD 2222-2222-2222-2222 EXP. 9/2002 | $0.00 | 9876 PARK AVE. CITY, USA | C1234 |
| T 000 003 | 1/10/2001 3:02 AM | P456, P789, P789 | AMEX 9999-9999-9999-9999 EXP. 4/2005 | $0.00 | 24 SHADY LA. TOWN, USA | C5678 |

| | SUBSIDIZING VENDOR IDENTIFIER 720 | SUBSIDIZING VENDOR NAME 722 | ACCOUNT 724 | AMOUNT OWED BY SUBSIDIZING VENDOR 726 | RANK 728 |
|---|---|---|---|---|---|
| 704 → | S001 | CREDIT CARD COMPANY X | BANK ACCOUNT #2345678 | $855.00 | 1 |
| 706 → | S002 | LONG DISTANCE TELEPHONE Y | MC 1111-2222-3333-4444 | $4,390.00 | 2 |
| → | S003 | SATELLITE TELEVISION Z | PREPAID BALANCE $10,500 | $0 | 3 |

FIG. 7

| OFFER IDENTIFIER 920 | TRANSACTION IDENTIFIER 922 | SUBSIDIZING VENDOR IDENTIFIER 924 | OFFER RULE APPLIED 926 | WHEN OFFERED 928 | EXPIRATION DATE 930 | SUBSIDY AMOUNT 932 | TOTAL PRICE 934 | TOTAL PRICE WITH SUBSIDY 936 | WHEN ACCEPTED 938 |
|---|---|---|---|---|---|---|---|---|---|
| F001 | T000000123 | S111 | R1230 | 8:15 AM 1/3/2001 | -- | $50 | $97.12 | $47.12 | 8:15 AM 1/3/2001 |
| F002 | T000000456 | S222 | R4561 | 1:01 PM 1/4/2001 | -- | $100 | $19.95 | $19.95 | REJECTED |
| F003 | T000000789 | S345 | R7892 | 3:09 PM 1/8/2001 | 11:59 PM 1/15/2001 | $10 | $10.00 | $0 | 11:10 AM 1/14/2001 |
| F004 | T000000109 | S678 | R0123 | 8:00 PM 1/12/2001 | 11:59 PM 1/22/2001 | $15 | $15.00 | $0 | 10:09 AM 1/20/2001 |
| F005 | T000000555 | S901 | R3454 | 12:35 AM 1/12/2001 | 11:59 PM 2/12/2001 | $75 | $48.00 | $0 | OFFER STILL OPEN |

| SUBSIDIZING VENDOR IDENTIFIER: S888 | | | 1002 |
|---|---|---|---|
| TOTAL NUMBER OF OFFERS: 1,794 | | | 1004 |
| TOTAL NUMBER OF OFFERS ACCEPTED: 1,003 | | | 1006 |
| TOTAL AMOUNT OF SUBSIDIES: $52,800.00 | | | 1008 |
| OFFER RULE IDENTIFIER 1020 | NUMBER OF OFFERS 1022 | NUMBER OF OFFERS ACCEPTED 1024 | AMOUNT OF SUBSIDIES DUE 1026 |
| R1111 | 1004 | 500 | $2,500.00 |
| R2222 | 790 | 503 | $50,300.00 |

| OFFER RULE IDENTIFIER    R 3333 | | | |
|---|---|---|---|
| CUSTOMER ACTIVITY 1120 | NUMBER OF OFFERS 1122 | NUMBER OF OFFERS ACCEPTED 1124 | ACCEPTANCE RATE 1126 |
| PUT ITEMS IN SHOPPING CART | 87 | 48 | 55% |
| ACCESS WEB PAGE 9876 | 39 | 19 | 49% |
| CLICK ON "PRODUCT INFORMATION" BUTTON | 45 | 20 | 44% |

FIG. 11

| | ITEM IDENTIFIER 1220 | ITEM DESCRIPTION 1222 | ITEM PRICE 1224 | AVAILABILITY 1226 |
|---|---|---|---|---|
| | P001 | WAR AND PEACE | $13.95 | IN STOCK |
| | P002 | SUN TZU: THE ART OF WAR | $15.95 | AVAILABLE IN 2-3 DAYS |

METHOD AND APPARATUS FOR PROVIDING CROSS-BENEFITS BASED ON A CUSTOMER ACTIVITY

The present application is a continuation of U.S. patent application Ser. No. 09/282,747 entitled METHOD AND APPARATUS FOR PROVIDING CROSS-BENEFITS BASED ON A CUSTOMER ACTIVITY filed Mar. 31, 1999 and issued as U.S. Pat. No. 7,827,057 on Nov. 2, 2010.

U.S. patent application Ser. No. 09/282,747 is a continuation-in-part of U.S. patent application Ser. No. 09/219,267 entitled "METHOD AND APPARATUS FOR FACILITATING ELECTRONIC COMMERCE THROUGH PROVIDING CROSS-BENEFITS DURING A TRANSACTION", filed on Dec. 23, 1998 now U.S. Pat. No. 7,831,470; and is a continuation-in-part of U.S. patent application Ser. No. 09/274,281 entitled "METHOD AND APPARATUS FOR PROVIDING CROSS-BENEFITS VIA A CENTRAL AUTHORITY", filed Mar. 22, 1999 and issued as U.S. Pat. No. 7,818,284 on Oct. 19, 2010; and is a continuation-in-part of U.S. patent application Ser. No. 09/116,367 entitled "METHOD AND APPARATUS FOR PROVIDING A DISCOUNT TO A CUSTOMER THAT PARTICIPATES IN TRANSACTIONS AT A PLURALITY OF MERCHANTS", filed Oct. 5, 1998 and now abandoned.

U.S. patent application Ser. No. 09/274,281 is a continuation-in-part of U.S. patent application Ser. No. 09/219,267 entitled "METHOD AND APPARATUS FOR FACILITATING ELECTRONIC COMMERCE THROUGH PROVIDING CROSS-BENEFITS DURING A TRANSACTION", filed Dec. 23, 1998.

The entirety of each of the applications identified above is incorporated by reference herein as part of the present disclosure.

FIELD OF THE INVENTION

The present invention relates to methods and apparatus for facilitating commerce.

BACKGROUND OF THE INVENTION

There is a great deal of competition among vendors to attract and retain customers. Even when a customer has browsed a vendor's inventory, he will not make a purchase if an item's price is greater than the amount the customer is willing to pay. One way to increase customer willingness to purchase is to provide discounts on items purchased. Unfortunately, vendors must use discounts sparingly, since reducing purchase prices likewise reduces margins and the reduced margins may not be offset by increased sales volume.

A vendor may also offer promotions to provide an incentive for customers to make purchases. For example, a vendor may offer a "buy one get one free" promotion whereby a purchase of an item yields the benefit of an additional item at no cost. Similarly, a vendor may provide a discount on a purchase in exchange for signing up for a credit card account provided by the vendor.

Promotions may also be provided among two or more vendors. For example, a first vendor may advertise that if a particular product is purchased, another product may be purchased from or given away by a second vendor.

A parent application of U.S. patent application Ser. No. 09/219,267 entitled "METHOD AND APPARATUS FOR FACILITATING ELECTRONIC COMMERCE THROUGH PROVIDING CROSS-BENEFITS DURING A TRANSACTION", filed Dec. 23, 1998, discloses a method and apparatus that permits a customer that is purchasing items from a first vendor to receive a benefit (e.g. a credit for the price of the items) from a second vendor. The present application provides further embodiments of this novel and beneficial invention.

SUMMARY OF THE INVENTION

It is an object of the present invention to provide a method and apparatus for facilitating commerce.

In accordance with the present invention, a controller receives information relating to customer activity with a first vendor, typically via a Web page that a customer accesses. The controller further receives an indication of items (goods and/or services) the customer desires to purchase, the items having an associated total price. The controller determines, based on any of various criteria, whether to provide an offer for a subsidy based on the information relating to customer activity. For example, a customer who places certain items in his virtual "shopping cart" may receive such an offer. The offer for a subsidy is from a second vendor (a subsidizing vendor), and may define, for example, a reduction in the price charged for the item and an obligation for the customer to fulfill in exchange for the subsidy. For example, the customer may be obliged to sign up for a credit card or telephone service provided by the subsidizing vendor.

An indication of the offer for the subsidy is provided to the customer, e.g., via a text or graphical display on the Web page. The customer responds via known user interface techniques and, if he accepts the offer, he is charged a second price for the items. The second price is less than the total price, and may even be zero. Thus the customer may get his desired items for free in exchange for fulfilling the obligation with the subsidizing vendor.

BRIEF DESCRIPTION OF THE DRAWINGS

FIG. 4 is a representation of a customer database of the controller of FIG. 2.

FIG. 5 is a representation of a vendor database of the controller of FIG. 2.

FIG. 6 is a representation of a transaction database of the controller of FIG. 2.

FIG. 7 is a representation of a subsidizer database of the controller of FIG. 2.

FIG. 9 is a representation of an offers database of the controller of FIG. 2.

FIG. 10 is a representation of a record of an offer summary database of the controller of FIG. 2.

FIG. 11 is a representation of a record of another embodiment of the offer summary database.

FIG. 12 is a schematic illustration of an item database of the vendor server of FIG. 3.

DETAILED DESCRIPTION OF THE PREFERRED EMBODIMENTS

Applicants have recognized that the acquisition budgets of various service providers may be advantageously used to facilitate commerce. A customer that purchases items from a first vendor may be paid, directly or indirectly, by a second vendor, so that the customer pays a reduced price, perhaps nothing at all, for his desired items. In exchange, the customer participates or agrees to participate in a transaction with the second vendor. For example, the customer may be required to sign up for a service that is provided by the second vendor. Since many service providers are willing to pay significant amounts of money (e.g. often $50 to $200) to acquire a new customer, the ability to acquire a customer by essentially "intervening" in a sale between others can benefit all parties involved. In short, the second vendor provides a subsidy to the customer. The customer is benefited by the reduced price of his items, the first vendor is benefited by the increased sales and customer satisfaction that such an arrangement would bring, and the second vendor is benefited by the additional transaction, particularly the acquisition of a new customer in one embodiment.

In addition, applicants have also recognized that various types of customer activities may be used to indicate, among other things, whether the customer is likely to accept an offer for a benefit from a subsidizing vendor. For example, when a customer begins to interact with a first vendor (e.g. via the first vendor's Web site), various types of customer activity may be used to indicate whether the customer is willing to transact with the first vendor. Similarly, various types of customer activity may be used to indicate whether the customer is willing to transact with a subsidizing vendor. Detection of such customer activity can assist is identifying, e.g., which customers should be given offers for subsidies, and when.

Figure 1A:
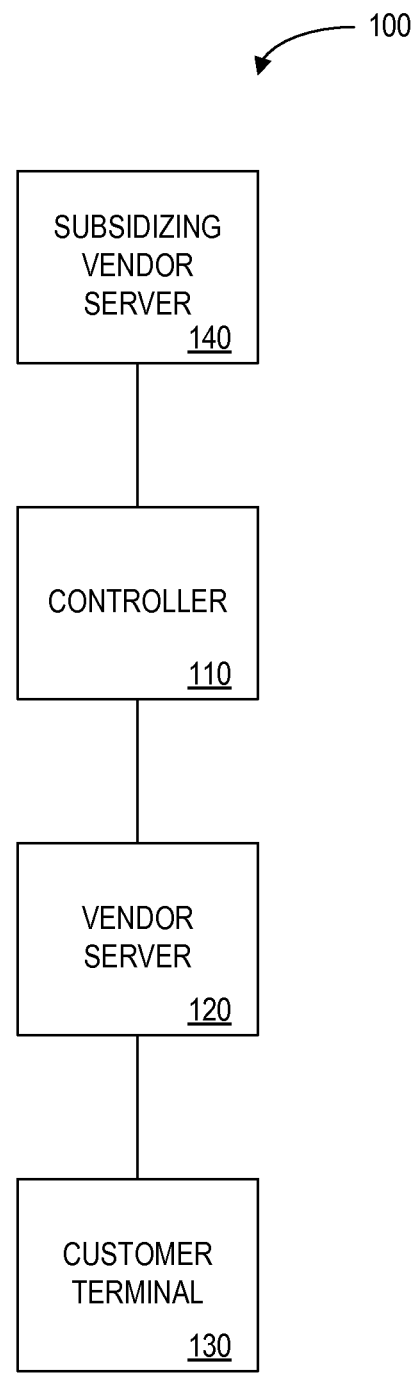
FIG. 1A is a schematic illustration of an embodiment of an apparatus for facilitating commerce in accordance with the present invention.

Referring to FIG. 1A, an apparatus 100 includes a controller 110 that is in communication with a vendor server 120. The controller 110 and the vendor server 120 may comprise computers, such as those based on an Intel® Pentium® microprocessor, that are adapted to communicate via the Internet (e.g. via a modem) or other medium. Any number of vendor servers may be in communication with the controller 110. Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The vendor server 120 may be a "Web server" of a vendor (e.g. a retail seller). A vendor server could then generate Web pages (documents on the World Wide Web that typically include an HTML file and associated graphics and script files) that may be accessed via the World Wide Web and allow purchases from the vendor to be made in a manner known in the art. A Web site consists of several such Web pages and associated databases served up by an HTTP server (e.g. the vendor server 120) on the World Wide Web. Alternatively, the vendor server 120 may be a computer involved in operating a physical store. Such a computer, for example a point of sale (POS) server, would perform such tasks as inventory management and transaction processing for the store.

The controller 110 is also in communication with a subsidizing vendor server 140. The subsidizing vendor server 140 may comprise a computer, such as those based on an Intel® Pentium® microprocessor, that is adapted to communicate via the Internet (e.g. via a modem) or other medium. Any number of subsidizing vendor servers may be in communication with the controller 110.

The subsidizing vendor server 140 may be a "Web server" of a vendor. The subsidizing vendor server 140 could then generate a Web page that may be accessed via the World Wide Web and allow transactions with the subsidizing vendor in a manner known in the art. Alternatively, the subsidizing vendor server 140 may be a computer involved in operating a physical store. Such a computer would perform such tasks as inventory management and transaction processing.

The vendor server 120 may be in communication with a customer terminal 130 that transmits data regarding a customer transaction (e.g. a purchase). Any number of customer terminals may be in communication with the vendor server 120. The customer terminal 130 may be a point of sale (POS) terminal, such as the NCR 7454 manufactured by NCR Corporation or the IBM 4683 manufactured by International Business Machines. As is known in the art, POS terminals perform such processes as calculating the total price of a purchase (goods or services) and calculating the amount of change due to a customer. POS terminals may furthermore track purchases made and adjust databases of inventory accordingly.

In another embodiment, the customer terminal 130 may be a computer, such as those based on an Intel® Pentium® microprocessor, that are adapted to communicate via the Internet (e.g. via a modem) or other medium. Such computers are able to appropriately access a Web page to communicate with a vendor server in a manner that is known to those skilled in the art.

In still other embodiments, the customer terminal 130 may be a telephone, an automated teller machine (ATM), slot machine, a vending machine or other device that receives payment from customers in exchange for providing goods or services. The vendor server in such an embodiment could include an IVRU (Interactive Voice Response Unit), such as the Vision 2001 or the Insight IVR/Web, both from Interactive Voice Technologies, Corp., or the OmniVox for Windows NT from APEX Voice Communications. An IVRU allows a user of a DTMF (Dual Tone Multi-Frequency) signal generating telephone to communicate with a computer. The DTMF signals received from the user's telephone are interpreted by the vendor server, and the vendor server may also communicate with the user by generating and transmitting voice or other audio signals, such as a list of IVRU menu options.

The use of the controller 110 is especially advantageous in an embodiment where a plurality of subsidizing vendors and/or a plurality of vendor servers serving customers participate in the described invention. A parent application, U.S. patent application Ser. No. 09/274,281 entitled "METHOD AND APPARATUS FOR PROVIDING CROSS-BENEFITS VIA A CENTRAL AUTHORITY", filed Mar. 22, 1999 and issued as U.S. Pat. No. 7,818,284 on Oct. 19, 2010, the entirety of which is incorporated by reference herein as part of the present disclosure, discloses an invention utilizing such a controller.

Figure 1B:
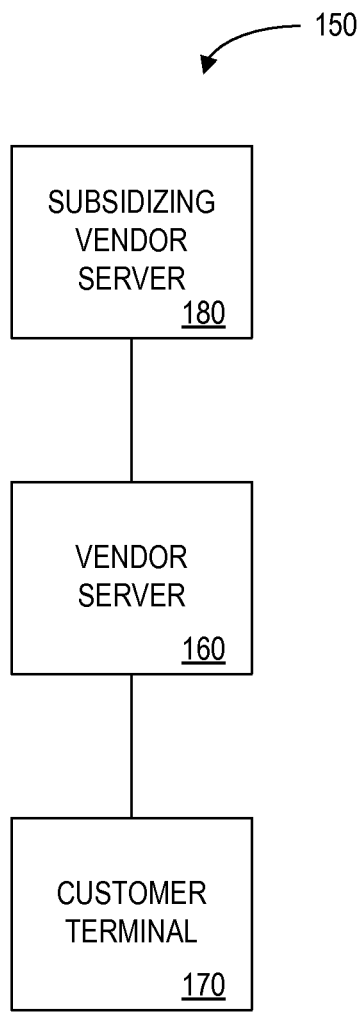
FIG. 1B is a schematic illustration of another embodiment of an apparatus for facilitating commerce in accordance with the present invention.

Referring to FIG. 1B, an apparatus 150 represents another embodiment of an apparatus for facilitating commerce in accordance with the present invention.

Specifically, in the apparatus 150 a vendor server 160 communicates with a customer terminal 170 and with a subsidizing vendor server 180 without the intervening controller 110. Accordingly, the embodiment illustrated by FIG. 1B is appropriate for a direct relationship between the vendor servicing customers and the subsidizing vendor.

Figure 2:
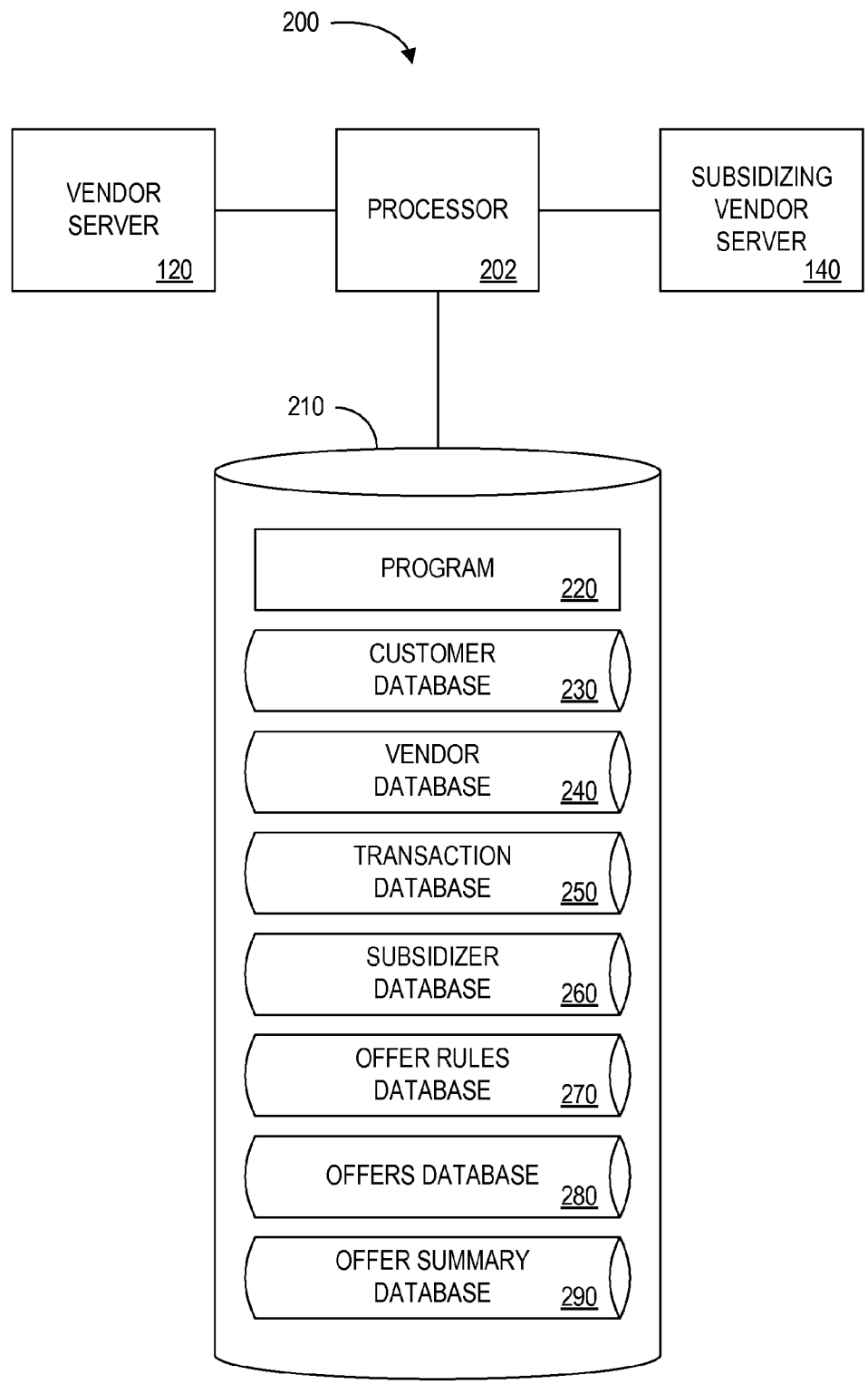
FIG. 2 is a schematic illustration of a controller of the apparatus of FIG. 1.

Referring to FIG. 2, reference numeral 200 indicates a device that may be the controller 110 (FIG. 1A). In another embodiment, the functionality of the device 200 may be performed by another device, such as the vendor server 160 (FIG. 1B), which operates to provide a customer with an offer for a subsidy from a second vendor.

The device 200 comprises a processor 202, such as an Intel® Pentium® microprocessor. The processor 202 is in communication with a data storage device 210, such as an appropriate combination of magnetic, optical and/or semiconductor memory. For example, the data storage device 210 may comprise one or more of a ROM, RAM and hard disk. The processor 202 and the data storage device 210 may each be (i) located entirely within a single computer or other computing device; (ii) connected to each other by a remote communication medium, such as a serial port cable, telephone line or radio frequency transceiver; or (iii) a combination thereof. In one embodiment, the controller 110 may comprise one or more computers that are connected to a remote server computer for maintaining databases.

The data storage device 210 stores a program 220 for controlling the processor 202. The processor 202 performs instructions of the program 220, and thereby operates in accordance with the present invention, and particularly in accordance with the methods described in detail herein. The program 220 furthermore includes program elements that may be necessary, such as an operating system and "device drivers" for allowing the processor 202 to interface with computer peripheral devices. Appropriate device drivers and other necessary program elements are known to those skilled in the art, and need not be described in detail herein.

The storage device 210 also stores (i) a customer database 230, (ii) a vendor database 240, (iii) a transaction database 250, (iv) a subsidizer database 260, (v) an offer rules database 270, (vi) an offers database 280 and (vii) an offer summary database 290. The databases 230, 240, 250, 260, 270, 280 and 290 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Figure 3:
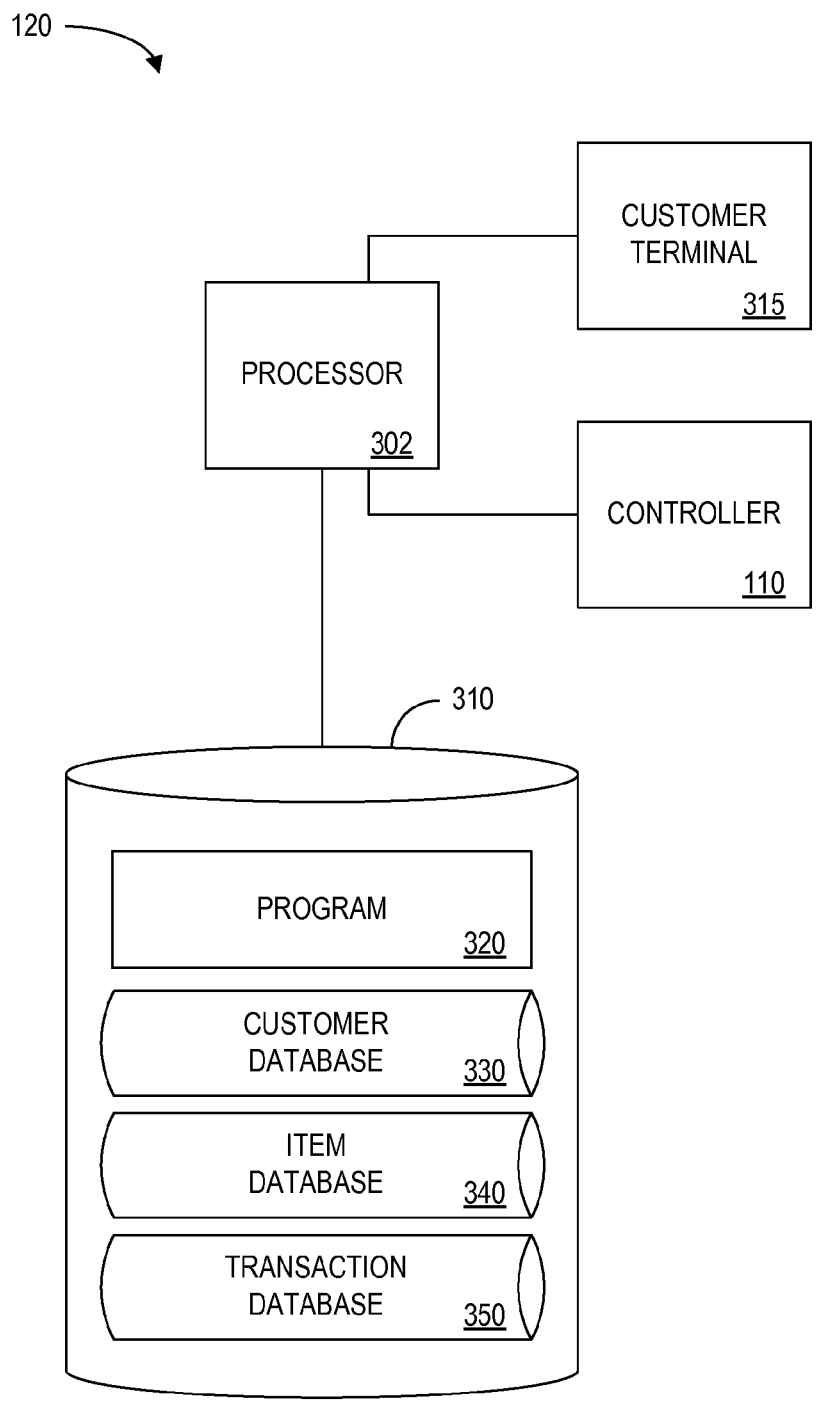
FIG. 3 is a schematic illustration of a vendor server of the apparatus of FIG. 1.

FIG. 3 illustrates the vendor server 120 of FIG. 1A. As described above with reference to FIG. 1B, in one embodiment the vendor server may communicate with a subsidizing vendor server 180 without the intervening controller 110. Accordingly, the description of the vendor server 120 is applicable to the vendor server 160 of FIG. 1B. In such an embodiment, the databases stored by the data storage device of the vendor server could include the databases depicted in FIGS. 2 and 3.

The vendor server 120 comprises a processor 302, such as an Intel® Pentium® microprocessor, which is in communication with a customer terminal 315 and the controller 110. The processor 302 is also in communication with a data storage device 310, such as an appropriate combination of magnetic, optical and/or semiconductor memory. For example, the data storage device 310 may comprise one or more of a ROM, RAM and hard disk. The processor 302 and the data storage device 310 may each be (i) located entirely within a single computer or other computing device; (ii) connected to each other by a remote communication medium, such as a serial port cable, telephone line or radio frequency transceiver; or (iii) a combination thereof. In one embodiment, the vendor server 120 may comprise one or more computers that are connected to a remote server computer for maintaining databases.

The data storage device 310 stores a program 320 for controlling the processor 302. The processor 302 performs instructions of the program 320, and thereby operates in accordance with the present invention, and particularly in accordance with the methods described in detail herein. The program 320 furthermore includes program elements that may be necessary, such as an operating system and "device drivers" for allowing the processor 302 to interface with computer peripheral devices. Appropriate device drivers and other necessary program elements are known to those skilled in the art, and need not be described in detail herein.

The storage device 310 also stores (i) a customer database 330, (ii) an item database 340, and (iii) a transaction database 350. The customer database 330 and the transaction database 350 of the vendor server 120 may be similar or identical to the customer database 230 and transaction database 250 of the controller 110. For example, the controller 110 may store data that is derived from the vendor server 120, and vice versa. If each vendor server stores data on its own customers and its own transactions, the controller 110 could aggregate this data from each vendor server.

The databases 330, 340 and 350 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Referring to FIG. 4, a table 400 represents an embodiment of the customer database 230 (FIG. 2) and/or the customer database 330 (FIG. 3). The table 400 includes entries 402, 404, 406 and 408, each defining a customer that may purchase items from a vendor. Such information may be determined, for example, when a customer registers for a frequent shopper card. Those skilled in the art will understand that the table 400 may include any number of entries. The table 400 also defines fields for each of the entries 402, 404, 406 and 408. The fields specify (i) a customer identifier 420 that uniquely identifies the customer, (ii) a name 422 of the customer, (iii) a billing address 424 of the customer, (iv) credit card information 426 which may be used to render payment in purchasing the items, and (v) an electronic mail ("e-mail") address 428 for communication with the customer.

For each entry of the table 400, the data specified by fields 422, 424, 426 and 428 may be received from the corresponding customer (e.g. via the corresponding customer terminal and/or vendor server that interacts with the customer). For example, the data may be provided when the customer makes a purchase from a vendor's Web site by requiring the customer to enter information into an HTML form provided on a Web page. Upon registration of a new customer, the controller 110 in the embodiment of FIG. 1A, or the vendor server 160 in the embodiment of FIG. 1B, would generate a unique customer identifier to store in the field 420 of the entry corresponding to the new customer. Once such information is stored for a customer, it may be retrieved upon reference to the appropriate customer identifier.

Referring to FIG. 5, a table 500 represents an embodiment of the vendor database 240 (FIG. 2). The table 500 includes entries 502, 504, 506 and 508, each defining a vendor that services customers and may have those customers receive offers for subsidies. Such information may be determined when a vendor registers for participation in the subsidizing program described herein. Those skilled in the art will understand that the table 500 may include any number of entries. The table 500 also defines fields for each of the entries 502, 504, 506 and 508. The fields specify (i) a vendor identifier 520 that uniquely identifies the vendor, (ii) a vendor name 522, (iii) a vendor e-mail address 524 for communication with the vendor, and (iv) an amount owed 526 to the vendor (e.g. promised but unpaid subsidy amounts).

For each entry of the table 500, the data specified by fields 522 and 524 may be received from the corresponding vendor (e.g. via the corresponding vendor server). For example, the data may be provided when the vendor registers with the controller 110 in the embodiment of FIG. 1A. Upon registration of a new vendor, the controller 110 in the embodiment of FIG. 1A, or the vendor server 160 in the embodiment of FIG. 1B, would generate a unique vendor identifier to store in the field 520 of the entry corresponding to the new vendor. Once such information is stored for a vendor, it may be retrieved upon reference to the appropriate vendor identifier.

Referring to FIG. 6, a table 600 represents an embodiment of the transaction database 250 (FIG. 2) and/or the transaction database 350 (FIG. 3). The table 600 includes entries 602, 604 and 606, each defining a transaction with a vendor server. Typically, the transaction includes a purchase of items by a customer. Those skilled in the art will understand that the table 600 may include any number of entries. The table 600 also defines fields for each of the entries 602, 604 and 606. The fields specify (i) a transaction identifier 620 that uniquely identifies the transaction, (ii) a time 622 of the transaction, (iii) the items ordered 624, (iv) credit card information 626 that may define a credit card account that was charged to pay for the items purchased, (v) an amount charged 628 for the items, (vi) a delivery address 630 for the items, and (vii) a customer identifier 632 (if any) that identifies the customer that made the purchase.

For each entry of the table 600, the data specified by fields 624, 626, 628, 630 and 632 may be received via the corresponding customer terminal. For example, the items ordered may be identified by being scanned by a bar code scanner that transmits a representative signal to a POS terminal. Alternatively, the items ordered may have been selected by a customer via a Web page displayed by his personal computer. Other ways to indicate items the customer desires to purchase will be apparent to those skilled in the art. Similarly, the credit card information may be read by a credit card reader that transmits a representative signal to a POS terminal. Alternatively, the credit card information may be entered by a customer into a form on a Web page displayed by his personal computer. Those skilled in the art will understand that other payment identifiers besides credit card information may be employed, such as debit card numbers, electronic cash identifiers. The use herein of a credit card as a means of payment is merely exemplary and not limiting on the scope of the present invention.

The data may be transmitted from the customer device to the controller 110 in the embodiment of FIG. 1A, or to the vendor server 160 in the embodiment of FIG. 1B. A unique transaction identifier may be generated and the time of the transaction may be recorded (e.g. with reference to a clock signal generated by the customer terminal, vendor server, controller or other device). The transaction identifier and the time are stored in the fields 620 and 622 respectively of the entry corresponding to the new transaction. Once such information is stored for a transaction, it may be retrieved upon reference to the appropriate transaction identifier.

Referring to FIG. 7, a table 700 represents an embodiment of the subsidizer database 260 (FIG. 2). The table 700 includes entries 702, 704 and 706, each defining a subsidizing vendor that may subsidize purchases. Such information may be determined when a subsidizing vendor registers for participation in the subsidizing program described herein. Those skilled in the art will understand that the table 700 may include any number of entries. The table 700 also defines fields for each of the entries 702, 704 and 706. The fields specify (i) a subsidizing vendor identifier 720 that uniquely identifies the subsidizing vendor, (ii) a name 722 of the subsidizing vendor, (iii) an account 724 used to pay for the subsidies, (iv) an amount owed 726 by the subsidizing vendor, and (v) a rank 728 used to prioritize subsidizing vendors and/or subsidies from those subsidizing vendors. The ranks may be established periodically (e.g. once per year) based on various criteria. For example, the ranks may be adjusted dynamically based on the acceptance rates of offers from the subsidizing vendors and/or amount of funds the subsidizing vendors have provided in connection with their offers.

For each entry of the table 700, the data specified by fields 722 and 724 may be received from the corresponding subsidizing vendor (e.g. via the corresponding vendor server). For example, the data may be provided when the subsidizing vendor registers with the controller 110 in the embodiment of FIG. 1A, or with the vendor server 160 in the embodiment of FIG. 1B. Upon registration of a new subsidizing vendor, the controller 110 in the embodiment of FIG. 1A, or the vendor server 160 in the embodiment of FIG. 1B, would generate a unique subsidizing vendor identifier to store in the field 720 of the entry corresponding to the new subsidizing vendor. The amount owed is calculated and updated for each subsidizing vendor. Typically, the amount owed is updated when an offer from a particular subsidizing vendor is accepted by a customer. The rank of each subsidizing vendor is updated according to a ranking scheme. For example, subsidizing vendors may pay for a preferential rank, and/or rank may be determined by the number (or percentage) of corresponding offers that are accepted. Once such information is stored for a subsidizing vendor, it may be retrieved upon reference to the appropriate subsidizing vendor identifier.

Figure 8:
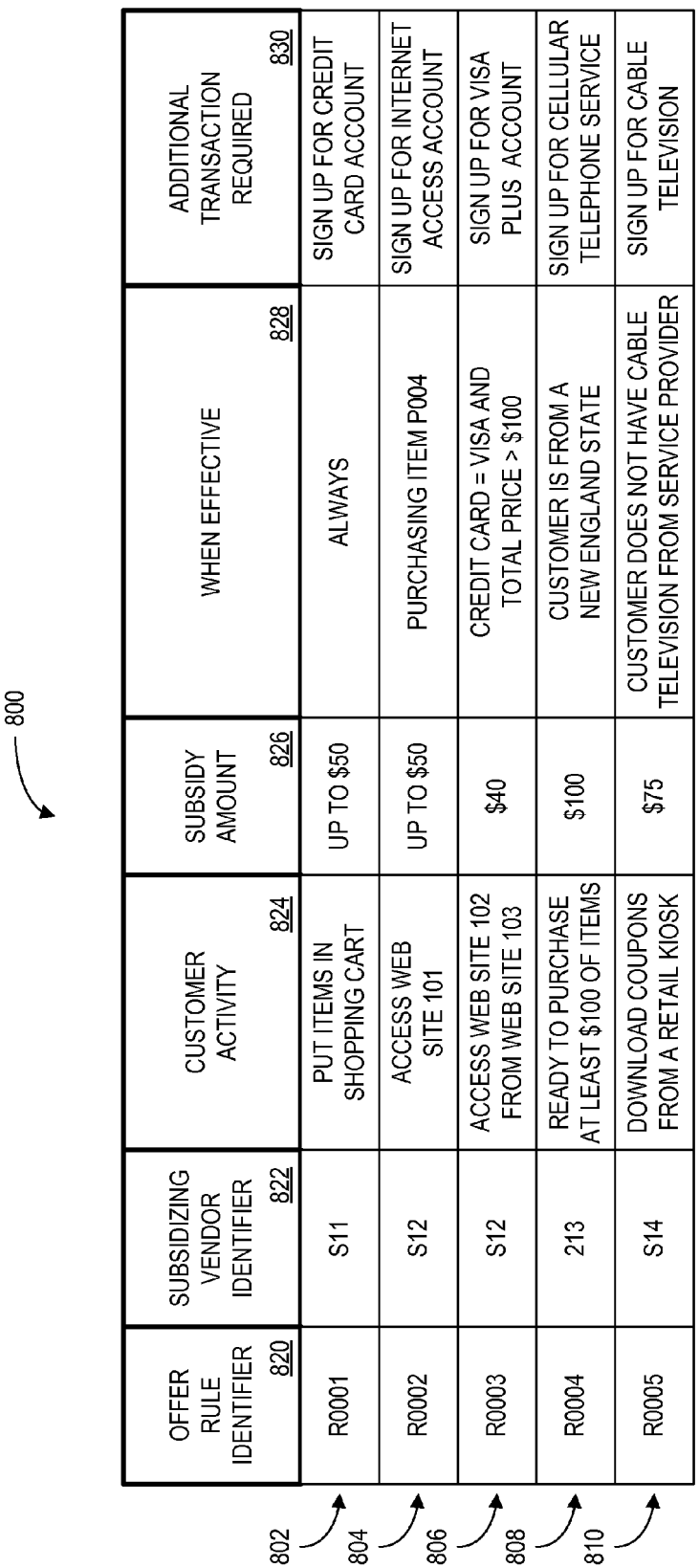
FIG. 8 is a representation of an offer rules database of the controller of FIG. 2.

Referring to FIG. 8, a table 800 represents an embodiment of the offer rules database 270 (FIG. 2). The table 800 includes entries 802, 804, 806, 808 and 810, each defining, among other things, an offer rule. When an offer rule is satisfied during a transaction, the vendor provides an offer for a specified benefit, such as a subsidy. Such information may be determined when a subsidizing vendor registers for participation in the subsidizing program described herein. Those skilled in the art will understand that the table 800 may include any number of entries. The table 800 also defines fields for each of the entries 802, 804, 806, 808 and 810. The fields specify (i) an offer rule identifier 820 that uniquely identifies the offer rule, (ii) a subsidizing vendor identifier 822 that uniquely identifies the subsidizing vendor, (iii) customer activity 824 that is required in order for an offer to be provided, (iv) a subsidy amount 826, (v) when the offer rule is effective 828 (i.e. other requirements in order to satisfy the offer rule), and (vi) an additional transaction 830 that is required of the customer in exchange for the subsidy. As described below, several types of transactions, such as additional purchases or initiating service agreements, may be required of the customer.

Some types of customer activity in a Web embodiment include a mouse click on a predetermined portion of a Web page, on a predetermined banner advertisement, and on an indication of an item. Similarly, a mouse-over (indication of cursor location and/or movement) on a predetermined portion of a Web page and on predetermined portions of Web pages at least a predetermined number of times may be desirable customer activities. Such customer activity can indicate, for example, that the customer is evaluating particular products on the Web site by clicking on particular links or placing the cursor over the links.

Some other types of customer activity in a Web embodiment include performing a search for a predetermined item, opening or accessing an electronic cash account (e.g. an e-cash "wallet"), accessing predetermined Web pages, a predetermined number of predetermined Web pages, predetermined Web pages in a predetermined sequence, or predetermined Web pages during a predetermined time period; a duration that the Web site is open; and previous access to a predetermined Web site at least a predetermined number of times.

Other types of customer activity include a predetermined number of items that a customer is ready to purchase from a vendor (indicated, for example, by the content of the customer's virtual shopping cart), one or more predetermined items that the customer is ready to purchase from a vendor, a duration that an item is selected for purchase, requesting a coupon for a predetermined item, an item having at least a predetermined price that the customer is ready to purchase from the first vendor, at least a predetermined number of previous purchases from the first vendor, and frequent shopper status of the customer.

For each entry of the table 800, the data specified by fields 824, 826, 828 and 830 may be received from the corresponding subsidizing vendor (e.g. via the corresponding subsidizing vendor server) for each offer rule the subsidizing vendor establishes. For example, the data may be provided when the subsidizing vendor registers with the controller 110 in the embodiment of FIG. 1A, or with the vendor server 160 in the embodiment of FIG. 1B. Upon creation of an offer rule, the controller 110 in the embodiment of FIG. 1A, or the vendor server 160 in the embodiment of FIG. 1B, would generate a unique offer rule identifier to store in the field 820 of the entry corresponding to the new offer rule. The corresponding subsidizing vendor identifier would also be stored in the field 822. Once such information is stored for an offer rule, it may be retrieved upon reference to the appropriate offer rule identifier.

The customer activity that is required in order for an offer to be provided may be set by the subsidizing vendor. Alternatively, the required customer activity may be set by the controller 110 for each subsidizing vendor. For example, the subsidizing vendor may be unable to decide which type of customer activity should be required. In still another embodiment, the required customer activity may be set and thereafter dynamically adjusted based on acceptance rates of provided offers.

Referring to FIG. 9, a table 900 represents an embodiment of the offers database 280 (FIG. 2). The table 900 includes entries 902, 904, 906, 908 and 910, each defining an offer for a subsidy. The offer was provided to a customer during a transaction of the customer with the vendor. Those skilled in the art will understand that the table 900 may include any number of entries. The table 900 also defines fields for each of the entries 902, 904, 906, 908 and 910. The fields specify (i) an offer identifier 920 that uniquely identifies the offer, (ii) a transaction identifier 922 that uniquely identifies the transaction during which the offer was provided, (iii) a subsidizing vendor identifier 924 that uniquely identifies the subsidizing vendor, (iv) an identifier of an offer rule 926 that was applied during the transaction, (v) when the offer was provided 928, (vi) an expiration date 930 (if any) for the offer, (vii) a subsidy amount 932, (viii) a total price 934 that the customer would have to pay without the subsidy, (ix) a total price 936 that the customer would have to pay with the subsidy, and (x) when the offer was accepted 938 (if it was accepted). As described above with reference to FIG. 8, offer rules define specific subsidies. Thus, the identifier of an offer rule stored in field 926 may be used to determine a corresponding subsidy amount.

The subsidy amount may be a fixed amount, such as $50. The subsidy amount may further be dependent on various criteria such as the purchase total. For example, the subsidy amount could be for the lesser of the purchase total and $50. Similarly, the subsidy amount could be for the lesser of a portion of the purchase total and $50. For example, the subsidy amount could be for the lesser of $50 and half the purchase total.

For each entry of the table 900, the data specified by fields 928, 934, 936 and 938 may be received from the corresponding customer terminal for each offer that has been provided. For example, when the offer is provided a new entry of the table 900 may be created. At that time, the date and time that the offer was provided may be recorded (e.g. with reference to a clock signal generated by the customer terminal, vendor server, controller or other device), and the total price and the total price with the subsidy amount may be received, e.g., from the POS terminal. The field 938 of the new entry would initially be set to "open" to indicate that the offer is open (not yet accepted or rejected). Field 922, 924 and 926 of the new entry would be set to the appropriate identifiers. Field 930 could be calculated from the field 928 (e.g. a predetermined time after the time in field 928 or "none" if there is no desired expiration date). Field 932 is determined from the corresponding offer rule applied, as described above with respect to field 826. Upon creation of an entry in the table 900, the controller 110 in the embodiment of FIG. 1A, or the vendor server 160 in the embodiment of FIG. 1B, would generate a unique offer identifier to store in the field 920. Once such information is stored for an offer, it may be retrieved upon reference to the appropriate offer rule identifier. The field 938 may be updated when an offer is rejected or accepted.

Referring to FIG. 10, a table 1000 represents a record of an embodiment of the offer summary database 290 (FIG. 2). The offer summary database 290 typically includes a plurality of records, each defining a summary of offers for subsidies that have been provided on behalf of a particular subsidizing vendor. The table 1000 includes a subsidizing vendor identifier 1002 that uniquely identifies the subsidizing vendor, a total number of offers provided 1004 on behalf of the subsidizing vendor, a total number of those offers that were accepted 1006, and a total amount 1008 of the subsidies due in connection with accepted offers.

The table 1000 also includes entries 1010 and 1012, each defining offers provided due to satisfaction of an offer rule of the subsidizing vendor. Those skilled in the art will understand that the table 1000 may include any number of entries. The table 1000 also defines fields for each of the entries 1010 and 1012. The fields specify (i) an offer rule identifier 1020 that uniquely identifies the offer rule, (ii) a number 1022 of offers provided due to the offer rule, (iii) a number 1024 of these offers that were accepted, and (iv) an amount 1026 of the subsidies due in connection with these accepted offers. If desirable, the information stored in the offer summary database 290 (FIG. 2) may be organized by the vendor through which the offer was provided. Such an embodiment would allow a comparison of the acceptance rate of offers at different vendors.

For each subsidizing vendor, the controller 110 in the embodiment of FIG. 1A, or the vendor server 160 in the embodiment of FIG. 1B, would create a record such as the record 1000 and store the subsidizing vendor identifier 1002. For each offer rule associated with the subsidizing vendor, a corresponding entry is created and the offer rule identifier is stored in field 1020. For each entry in the record, the data specified by fields 1022, 1024 and 1026 may be adjusted as offers are provided and acceptances of the offers are received. For example, when an offer is provided, the corresponding offer rule is identified and thus the corresponding entry is identified. The field 1022 of that entry is increased by one to reflect the newly-provided offer. Similarly, when an offer is accepted, field 1024 of that entry is increased by one to reflect the new acceptance and the amount of the subsidy associated with the accepted offer is added to the field 1026 of the entry.

The sum of the number of offers indicated by the field 1022 for all entries is stored as the total number of offers 1004 for the corresponding record. Similarly, the number of offers accepted indicated by the field 1024 for all entries is stored as the total number of offers accepted 1006 for the corresponding record, and the sum of the amounts indicated by the field 1026 for all entries is stored as the total amount 1008 for the corresponding record. Once such information is stored for a subsidizing vendor, it may be retrieved upon reference to the appropriate subsidizing vendor identifier. Accordingly, information for, e.g., account reconciliation for each subsidizing vendor may be derived from such information.

Referring to FIG. 11, a table 1100 represents a record of another embodiment of the offer summary database 290 (FIG. 2). In the illustrated embodiment, information is organized by offer rule. In one embodiment, for each offer rule various types of customer activity may have been required. The results of each type of customer activity are summarized in the record.

Various types of customer activity may be required for an offer rule in order to test which customer activities are relatively successful in soliciting an acceptance of an offer. For example, every hour a different customer activity may be required in order for an offer to be provided in accordance with the offer rule. In such an embodiment, each hour the controller 110 (FIG. 1A) may update the customer activity field 824 of an entry of the offer rules database 270 to reflect the new customer activity that is required. The most successful customer activity requirement may then be used in the future.

The offer summary database 290 can include a plurality of records, each defining a summary of offers for subsidies that have been provided in response to a customer activity in accordance with the offer rule. The table 1100 includes an offer rule identifier 1102 that uniquely identifies the offer rule. The table 1100 also includes entries 1104, 1106 and 1108. Each entry defines offers provided in accordance with the offer rule and upon certain customer activity. Those skilled in the art will understand that the table 1100 may include any number of entries. The table 1100 also defines fields for each of the entries 1104, 1106 and 1108. The fields specify (i) customer activity 1120 required for the offer, (ii) a number 1122 of offers provided due to the particular customer activity for the offer rule, (iii) a number 1124 of these offers that were accepted, and (iv) an acceptance rate 1126 (the ratio of offers accepted to number of offers provided). If desirable, the information stored in the offer summary database 290 (FIG. 2) may be organized according to other information.

For each offer rule, the controller 110 in the embodiment of FIG. 1A, or the vendor server 160 in the embodiment of FIG. 1B, would create a record such as the record 1100 and store the offer rule identifier 1102. For each customer activity that was or is associated with the offer rule, a corresponding entry is created and an indication of the customer activity is stored in field 1120. For each entry in the record, the data specified by fields 1122, 1124 and 1126 may be adjusted as offers are provided and acceptances of the offers are received. For example, when an offer is provided in response to a particular customer activity, the corresponding entry is identified. The field 1122 of that entry is increased by one to reflect the newly-provided offer. Similarly, when an offer is accepted, field 1124 of that entry is increased by one to reflect the new acceptance and the acceptance rate is calculated and stored in the field 1126 of the entry. Once such information is stored for an offer rule, it may be retrieved upon reference to the appropriate offer rule identifier.

Referring to FIG. 12, a table 1200 represents an embodiment of the item database 340 (FIG. 3). The table 1200 includes entries 1202 and 1204, each defining an item sold via a vendor server. Those skilled in the art will understand that the table 1200 may include any number of entries. The table 1200 also defines fields for each of the entries 1202 and 1204. The fields specify (i) a item identifier 1220 that uniquely identifies the item, (ii) an item description 1222, (iii) an item price 1224 for which the item is typically sold, and (iv) an availability 1226 of the item which may be based on an inventory level of the item.

For each entry of the table 1200, the data specified by fields 1222, 1224 and 1226 may be received from the corresponding vendor. For example, the data may be provided when a vendor prepares to sell the item. Upon the entering of a new item, the vendor server would generate a unique customer identifier to store in the field 1220 of the entry corresponding to the new item. Once such information is stored for an item, it may be retrieved upon reference to the appropriate item identifier.

Figure 13:
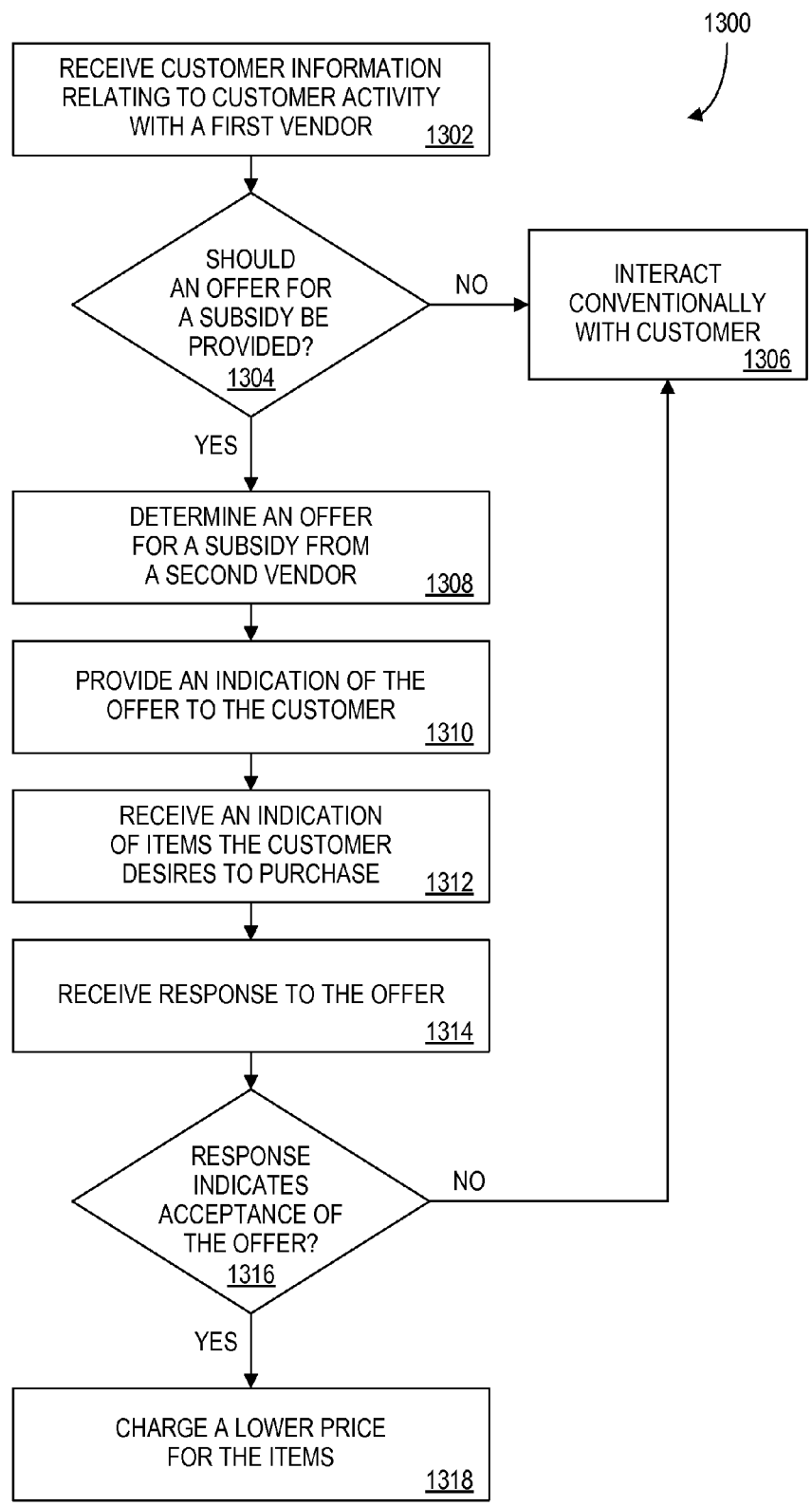
FIG. 13 is a flow chart illustrating an embodiment of a method for providing an offer for a benefit.

Referring to FIG. 13, a flow chart 1300 illustrates an embodiment of a method for providing an offer for a benefit (e.g. a reduced price) to a customer that is to purchase items from a vendor. Although the illustrated method is described below as being performed by the controller 110 in the embodiment of FIG. 1A, the illustrated method may alternatively be performed by the vendor server 160 in the embodiment of FIG. 1B.

Information relating to customer activity of a customer with a first vendor is received (step 1302). Such information may be received via a Web server, for example, in an embodiment where a vendor sells via the Internet. The Web server, which may be the vendor server, may receive data from the customer terminal that indicates, for example, hyperlinks that the customer clicks on, buttons that the customer actuates, or mouse movements of the customer terminal.

The information may be received from a "cookie" stored on the customer terminal (e.g. on a personal computer of the customer). Such a cookie is a block of data that a Web server (e.g. the vendor server) stores on a client system (e.g. a customer terminal). When a user returns to the same Web site, the browser of the customer terminal sends a copy of the cookie back to the Web server. Cookies may be used to identify users of the customer terminal, to instruct the Web server to send a customized version of a Web page, to submit account information for the user, and for other administrative purposes.

The information may be received via a telephone, for example, in an embodiment where a vendor sells via an IVRU. The information may also be received via a POS terminal, for example, in an embodiment where a vendor sells at a retail store. The POS terminal receives data such as UPC codes that identify items scanned with a bar code scanner, prices of those items, and information received from a customer's frequent shopper card. Similarly, the information may be received via a device, such as a PDA (Personal Digital Assistant) or a scanner mounted on a shopping cart, that the customer uses to indicate the items he has selected for purchase or the items in which he his otherwise interested.

The information may also be received via a sensor that senses the presence or location of a customer. For example, infrared or pressure sensors may be disposed in a store and operable to sense when a customer is near particular products or areas.

The information may also be received via a device that scans items with a bar code scanner and provides the prices of those items that are scanned. Such devices are known and are frequently disposed in supermarkets to allow customers to determine the prices of items, especially items that are on sale or otherwise subject to special pricing.

It is then determined whether an offer for a subsidy should be provided (step 1304). In one embodiment, the information relating to customer activity dictates whether the offer is provided. For example, as described in detail below there may be one or more rules specifying customer activity that is required. If an offer should not be provided, then the controller 110 interacts with the customer conventionally (step 1306).

Otherwise, an offer for a subsidy from a second vendor is determined (step 1308). For example, in an embodiment where one or more rules are included, if a rule is satisfied a corresponding offer for a subsidy is provided. An indication of the offer (or offers) is provided to the customer (step 1310). For example, text and/or images may be displayed on a Web page that is displayed on the customer terminal, text may be displayed on a monitor of a POS terminal, or an audio signal may be transmitted via an IVRU to a telephone.

The indication of the offer may be provided via a device, such as a PDA (Personal Digital Assistant) or a display mounted on a shopping cart of the customer, that accompanies the customer as he browses a store. Similarly, a display disposed in a particular location in the store (e.g. below a product display) may provide an offer to a customer that is near particular products or areas.

The indication of the offer may be provided via a device that scans items with a bar code scanner and provides the prices of those items scanned. In one embodiment, such a device could display an offer upon scanning the bar code of an item.

The offer typically specifies a subsidy amount and an obligation to fulfill in exchange for the subsidy. For example, an additional transaction may be required of the customer. In an embodiment where the second vendor provides services, the customer may be required to sign up for a service that is provided by the second vendor (e.g. initiate a service agreement with the second vendor). The customer may be required to switch from a current service provider to the second vendor, so that the service will no longer be provided by the current service provider.

Examples of services include telephone service, Internet service, banking services, credit card account services, insurance service, securities trading service, utilities service, satellite television service, or cable television service. Telephone service can include long distance service such as is provided by Sprint Communications Company, L.P or wireless service such as is provided by AT&T. Signing up for banking services may include the requirement to transfer a particular minimum balance to a new bank account. Signing up for credit card account services may similarly include the requirement to apply for a credit card account and/or transfer a particular minimum balance to a new or existing credit card account. Signing up for securities trading services may include the requirement to open an account with a particular minimum balance amount.

The controller 110 receives an indication of items the customer desires to purchase (step 1312). For example, the items may have been scanned by a bar code scanner and thus identified by a POS terminal. Alternatively, the items may have been selected by a customer via a Web page and put in a virtual "shopping cart". Other ways to indicate items the customer desires to purchase will be apparent to those skilled in the art.

The controller 110 also receives a response to the offer from the customer terminal (step 1314). The customer may indicate his response by, for example, clicking a button on a Web page, actuating particular keys on a touch-tone telephone, actuating a button on a keypad in communication with a POS terminal, or verbally responding to a cashier that actuates buttons on the POS terminal.

If the response does not indicate an acceptance of the offer (step 1316), then the controller 110 interacts with the customer conventionally (step 1306). Otherwise, the offer is accepted and the customer is charged a lower price for the items than he otherwise would have been charged (step 1318). The customer may even get the items for free or receive a credit (e.g. money back or store credit). In another embodiment, the benefit to the customer may be different than a reduced price on the items he desires to purchase. For example, the customer may be given a product upgrade to another (higher value) item or the customer may be given an additional item at a discount or for free. The customer may also be provided with cash, store credit or other monetary award.

The customer may be charged the lower price in single transaction. For example, if an item is normally sold for $80, but is sold to a particular customer for $60 in connection with an offer for a subsidy, a credit card account of the customer may be charged $60 in one transaction. Alternatively, the customer's credit card account may be charged $80, and then subsequently credited for $20 ($20=$80−$60).

Figure 14:
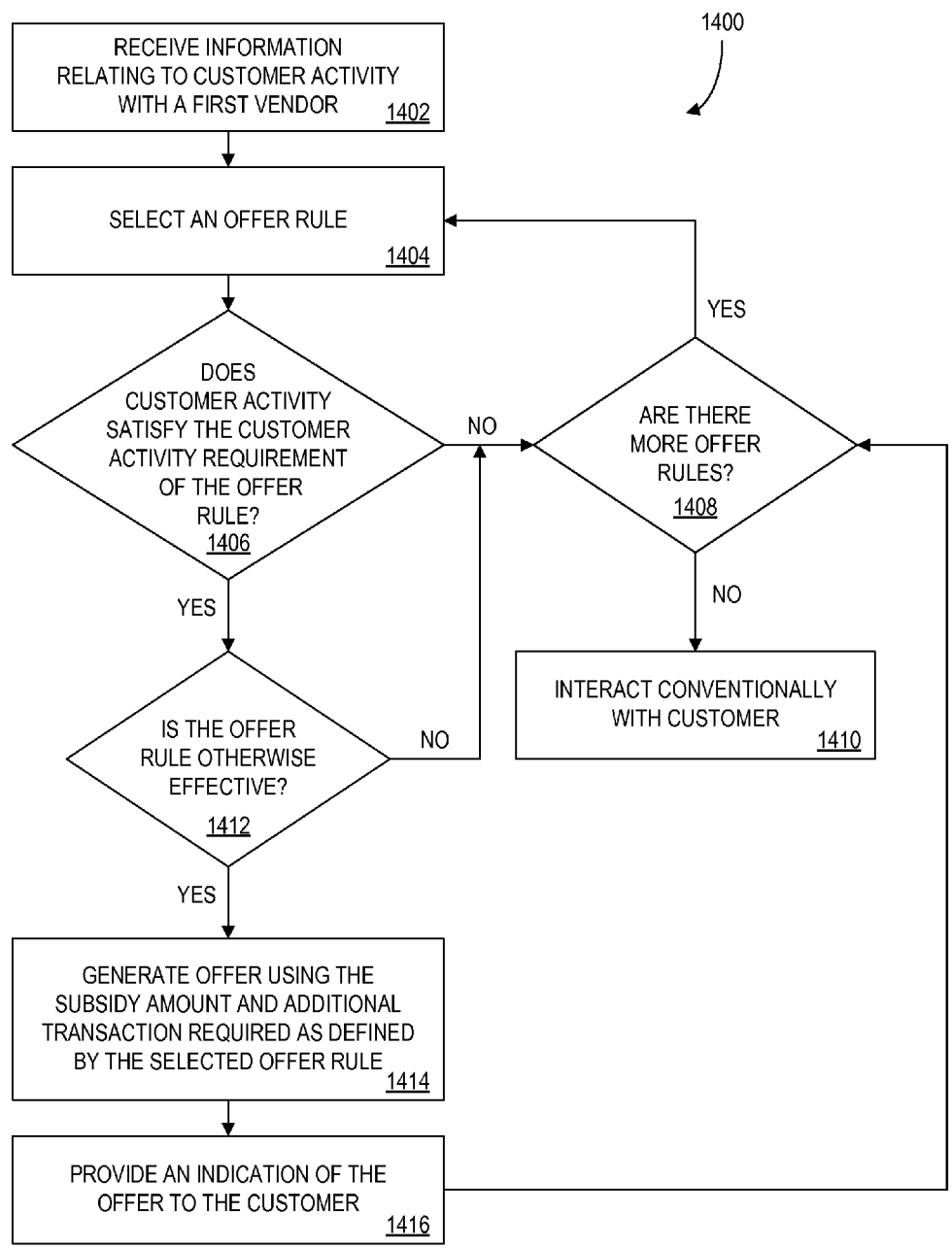
FIG. 14 is a flow chart illustrating an embodiment of a method for providing an offer for a benefit using offer rules.

Referring to FIG. 14, a flow chart 1400 illustrates an embodiment of a method for providing an offer for a benefit to a customer that is to purchase items from a vendor. In particular, in the illustrated embodiment one or more rules determine which offers (if any) are provided to a customer. Although the illustrated method is described below as being performed by the controller 110 in the embodiment of FIG.

1A, the illustrated method may alternatively be performed by the vendor server 160 in the embodiment of FIG. 1B.

Information relating to customer activity of a customer with a first vendor is received (step 1402), as described above. The controller selects an offer rule to evaluate against the customer activity (step 1404). The rule may be defined by and selected from the offer rules database 270 (FIG. 2). For example, referring again to FIG. 8, each entry of the table 800 defines an offer rule. Accordingly, the controller 110 may select an entry of the offer rules database 270 (e.g. starting with the first entry).

As described above, each offer rule includes customer activity that is required in order for an offer to be provided. Accordingly, the received information relating to customer activity may be compared with the customer activity that is required by the offer rule (step 1406). If the customer activity does not satisfy the offer rule, then it is determined whether there are more offer rules that have not yet been so compared to the received information (step 1408). If there are not any more offer rules, then the controller 110 interacts conventionally with the customer (step 1410).

If there are more offer rules, then another offer rule is selected (step 1404). For example, the next entry in the offer rules database 270 may be selected. Those skilled in the art will realize that the offer rules need not be selected according to the sequence defined by the offer rules database 270.

If the customer activity does satisfy the offer rule, then the controller 110 determines if the offer rule is otherwise effective (step 1412). For example, referring to FIG. 8, each entry of the table 800 defines other requirements necessary in order to satisfy the offer rule (i.e. the field 828). If the rule is not otherwise effective (i.e. the other requirements are not satisfied), then it is determined whether there are more offer rules that have not yet been so compared to the received information (step 1408). If there are not any more offer rules, then the controller 110 interacts conventionally with the customer (step 1410). Otherwise, another offer rule is selected (step 1404).

If the offer rule is otherwise effective, then the controller 110 generates an offer (step 1414). The offer indicates the subsidy amount (specified by the field 826 of the corresponding entry) and an additional transaction required (specified by the field 830 of the corresponding entry). An indication of the offer is provided to the customer (step 1416), as described above. If there are any more offer rules, then they are in turn selected and evaluated as described above.

The illustrated method allows one or more offers to be provided to a customer. The customer may in turn accept an offer as described above. In particular, if a plurality of offers are provided to the customer substantially simultaneously, the customer may be asked to select one (or more) of the plurality, and the selection would indicate an acceptance of the selected offer. Alternatively, if a plurality of offers are provided sequentially (i.e. another offer is provided if a prior offer is not accepted), then the sequence of the offers may be defined by, for example, the ranks of the corresponding subsidizing vendors.

Figure 15A:
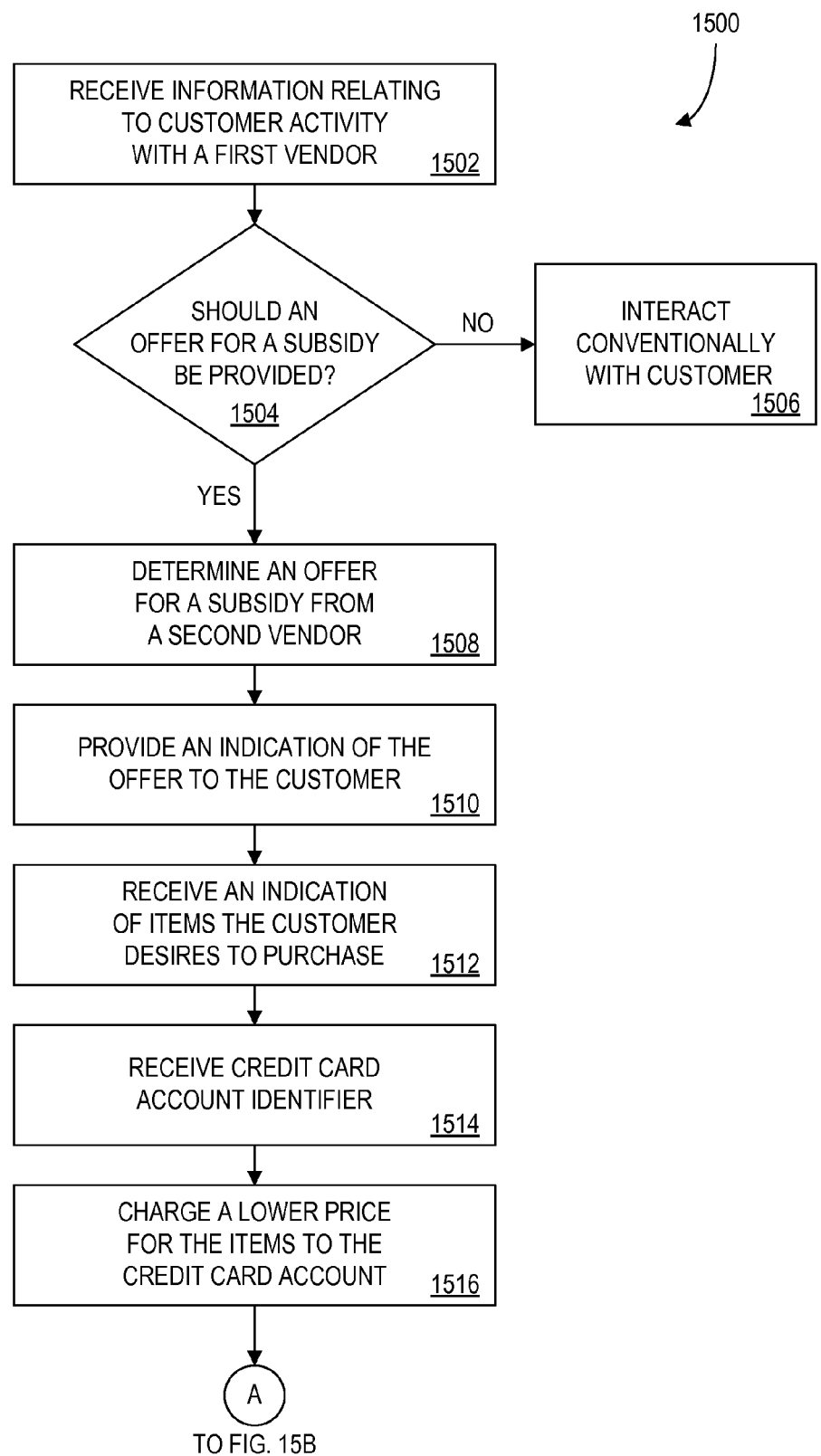
FIGS. 15A and 15B are a flow chart illustrating an embodiment of a method for providing an offer which may be accepted by fulfilling an obligation associated with the offer.
Figure 15B:
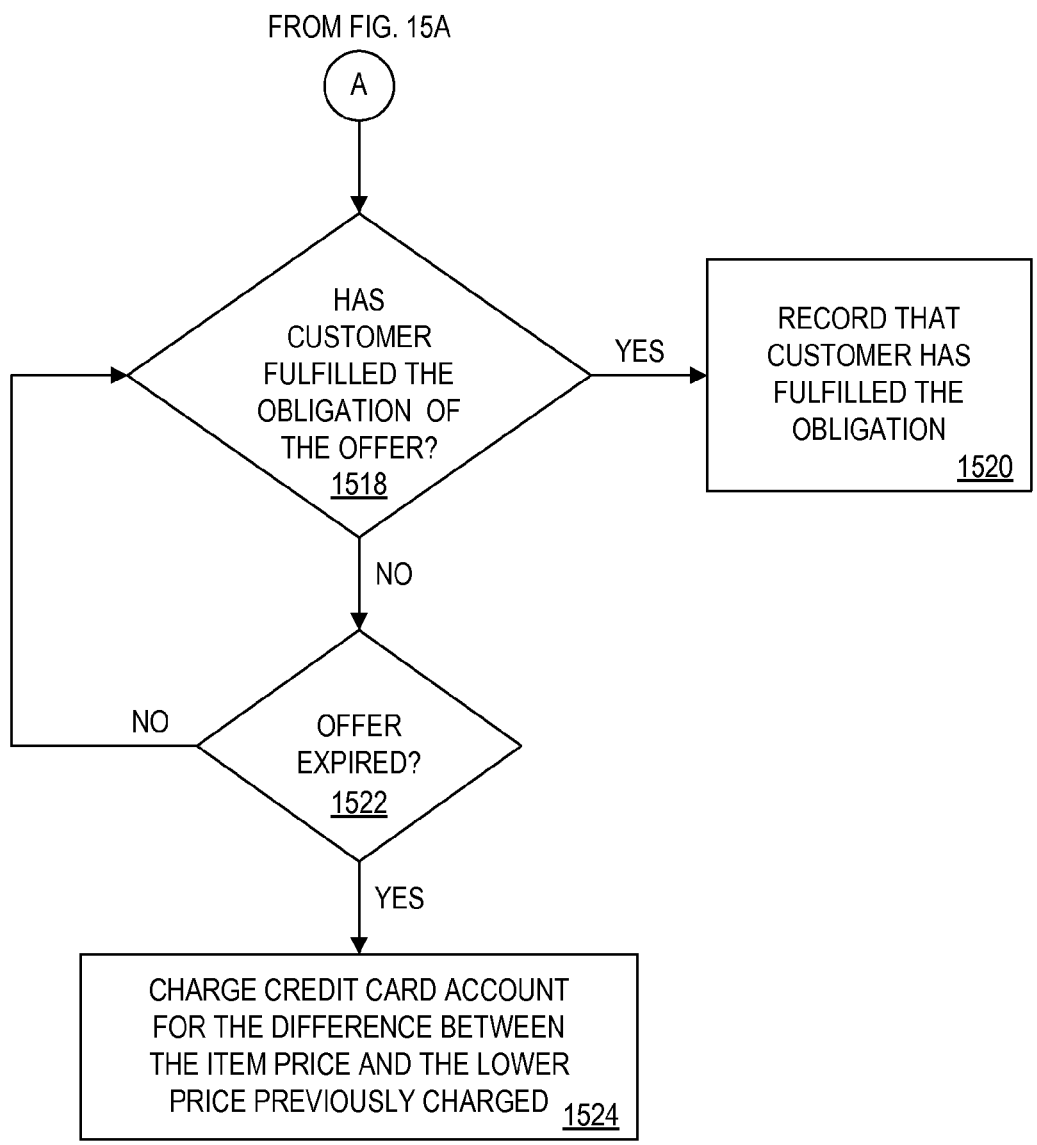

Referring to FIGS. 15A and 15B, a flow chart 1500 illustrates an embodiment of a method for providing an offer for a benefit to a customer that is to purchase items from a vendor. In particular, in the illustrated embodiment a customer receives a subsidy subject to an obligation. The customer may receive an immediate benefit in exchange for participating or agreeing to participate in a transaction with the second vendor. For example, the customer may be required to participate in a future transaction with the second vendor. Although the illustrated method is described below as being performed by the controller 110 in the embodiment of FIG. 1A, the illustrated method may alternatively be performed by the vendor server 160 in the embodiment of FIG. 1B.

Information relating to customer activity of a customer with a first vendor is received (step 1502). It is then determined whether an offer for a subsidy should be provided (step 1504). If an offer should not be provided, then the controller 110 interacts with the customer conventionally (step 1506). Otherwise, an offer for a subsidy from a second vendor is determined (step 1508). For example, the information relating to customer activity may satisfy a rule, and the rule in turn specifies an offer. The controller 110 provides an indication of the offer (including its associated obligation) to the customer (step 1510).

The controller 110 receives an indication of items the customer desires to purchase (step 1512). The controller 110 also receives a credit card account identifier (step 1514), such as a credit card number. The credit card account identifier may be received, for example, via a credit card authorization terminal that is in communication with a POS terminal, as is known to those skilled in the art.

The credit card account is charged a lower price for the items than otherwise would have been charged (step 1516). The customer may even get the items for free. The controller 110 determines whether the customer has fulfilled the obligation of the offer (step 1518). For example, the obligation could be a requirement to sign up for a service provided by the second vendor. In such an embodiment, the second vendor may provide, for example, telephone service, Internet service, banking services, credit card account services, insurance service, securities trading service, satellite television service, or cable television service. The obligation may further include a requirement that the service be maintained for a particular amount of time.

In some embodiments, the customer may have been required to fulfill the obligation before his credit card account is charged. For example, the customer may have been required to fill out a credit card application before completing the purchase of his items. In other embodiments, the obligation may be need to be fulfilled at still other times.

The controller 110 can access a list of new or existing customers to determine whether the customer has fulfilled his obligation by signing up (and therefore becoming a new customer). The controller 110 could access such a list periodically (e.g. every week) or upon demand (e.g. the controller receives the names of new customers as they become available). Alternatively, the controller 110 could query the subsidizing vendor server, and in response receive a signal that indicates whether the customer had signed up for service from the second vendor. Similarly, the customer could be required to switch service providers from another service provider to the second vendor.

If the customer has fulfilled the obligation, then the controller 110 records the time and date the obligation was fulfilled (step 1520). The time and date may be stored, for example, in the field 938 of the entry corresponding to the offer. In such an embodiment, fulfilling the obligation may be considered acceptance of the offer.

If the customer has not fulfilled the obligation, then it is determined whether the offer has expired (step 1522). The expiration date and time of an offer is indicated by the field 930 of the offers database 280 (FIG. 2), and may be calculated based on the time the offer was provided. If the offer has expired without the obligation being fulfilled, the credit card account of the customer is charged for the difference between the item price and the lower price previously charged (step 1524). This step assesses a penalty against the customer by removing the benefit that was previously provided to the customer if the customer does not fulfill the obligation within the allotted time. For example, if the credit card account was previously charged $80 (in one or more transactions) in step 1516 for a $95 item, then in step 1524 the credit card account is charged $15 ($15=$95−$80). Thus, if the obligation is not fulfilled, the credit card account is charged $95 in total ($80 and $15), which is the conventional price for the item. An even larger amount may be charged (i.e. greater than $15 in the above example) if desired to deter customers from reneging on the obligation.

Figure 16:
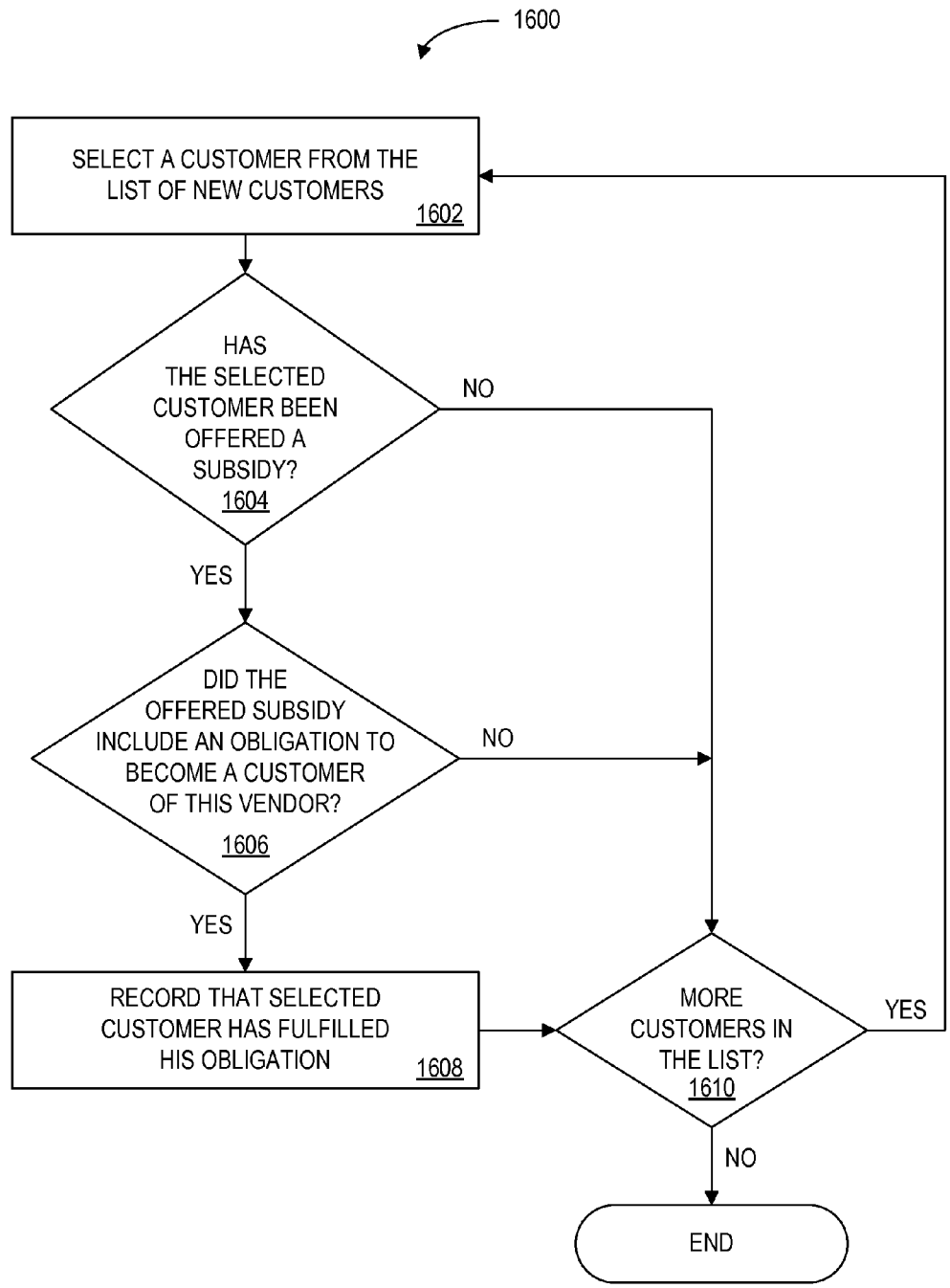
FIG. 16 is a flow chart illustrating an embodiment of a method for determining whether customers have fulfilled their obligations associated with an offer for a benefit.

Referring to FIG. 16, a flow chart 1600 illustrates an embodiment of a method for determining whether customers have fulfilled their obligations associated with an offer for a benefit. Although the illustrated method is described below as being performed by the controller 110 in the embodiment of FIG. 1A, the illustrated method may alternatively be performed by the vendor server 160 in the embodiment of FIG. 1B.

In the illustrated embodiment the obligation is to become a new customer of a subsidizing vendor. For example, the customer may have been obliged to initiate a new service agreement so that a particular service is provided to the customer by the subsidizing vendor. Those skilled in the art will understand the various modifications required in embodiments with other types of obligations.

The controller 110 selects a customer from a list of new customers (step 1602) of the subsidizing vendor. The list of new customers may be generated by the subsidizing vendor and transmitted to the controller 110 periodically (e.g. every week) or upon request. Such a list may be compiled by the subsidizing vendor as customers sign up for service and/or complete prerequisites for becoming a customer. Customers may be selected from the list, for example, in the order that they signed up during a predetermined period of time.

The controller 110 then determines if the selected customer has been offered a subsidy (step 1604). The controller may determine whether the selected customer is represented in any entry of the offers database 280. For example, referring again to FIG. 9, each entry of the table 900 includes in field 922 an indication of the transaction during which the offer was provided. The corresponding entry of the transaction database 250 in turn indicates a customer identifier (e.g. the field 632 of the table 600). If the selected customer has not been offered a subsidy, then the controller 110 determines whether there are more customers that have not yet been selected (step 1610). Another customer is selected (step 1602) as long as there are more customers in the list that have not been selected.

If the selected customer has been offered a subsidy, the controller 110 determines if the offer for the subsidy included an obligation to become a customer of the subsidizing vendor (step 1606). For example, referring again to FIG. 9, each entry of the table 900 includes in field 926 an indication of the offer rule applied during the transaction. The corresponding entry of the offer rules database 270 in turn indicates an additional transaction required of the customer (e.g. in the field 830 of the table 800). Thus, the controller 110 determines whether the presence of the selected customer on the list of new customers indicates fulfillment of a previous obligation.

If the offer for the subsidy included an obligation to become a customer of the subsidizing vendor, then the controller 110 records that the selected customer has fulfilled his obligation (step 1608). For example, the time and date that the customer became a new customer of the subsidizing vendor may be recorded in the field 938 of the corresponding entry of the table 900. Then additional customers, if any, are selected and processed similarly (e.g., steps 1610 and 1602). Customers that have not fulfilled their respective obligations may eventually be penalized in some manner, for example, by charging their credit card accounts a penalty fee amount.

In contrast to the above-described method, the controller 100 could search a list of customers that have accepted offers, rather than a list of new customers, in order to determine whether those customers have become new customers of the specified vendor.

Figure 17:
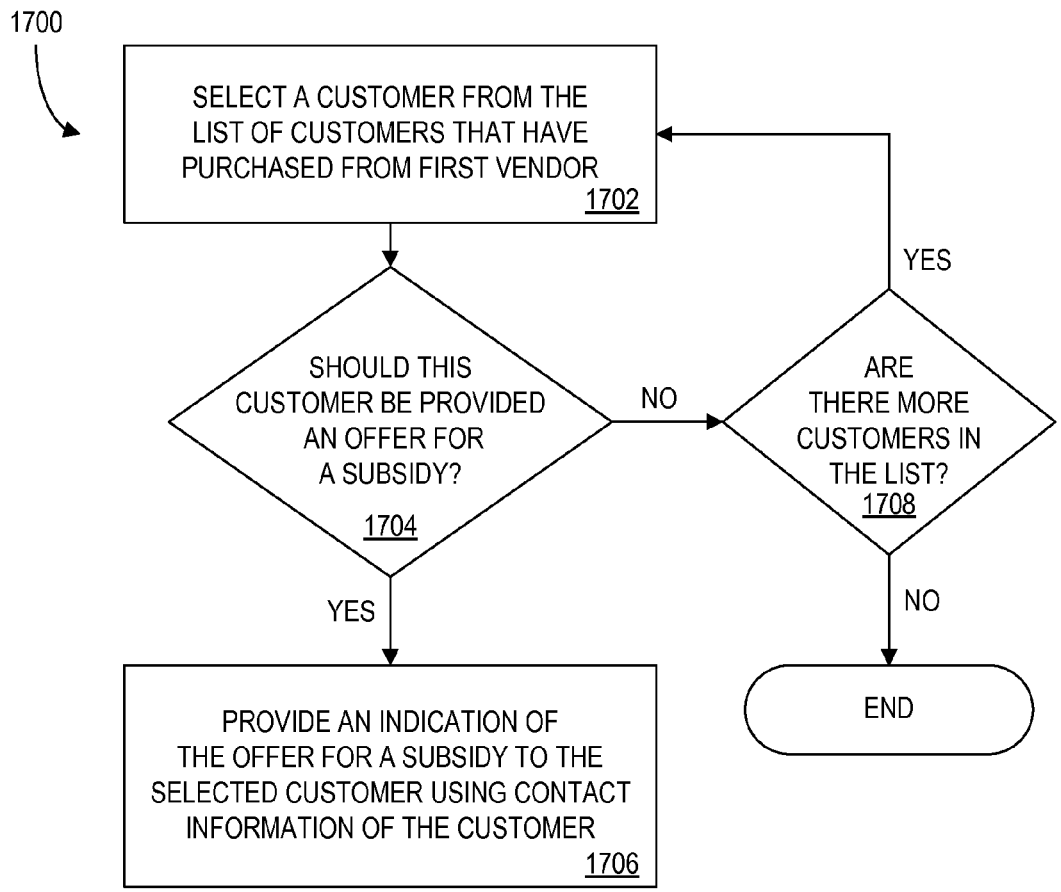
FIG. 17 is a flow chart illustrating an embodiment of a method for providing an offer for a benefit after a customer has made a purchase from a vendor.

Referring to FIG. 17, a flow chart 1700 illustrates an embodiment of a method for providing an offer for a benefit after a customer has made a purchase from a first vendor. Although the illustrated method is described below as being performed by the controller 110 in the embodiment of FIG. 1A, the illustrated method may alternatively be performed by the vendor server 160 in the embodiment of FIG. 1B.

The controller 110 selects a customer from the list of customers that have purchased from the first vendor (step 1702). For example, as is known in the art the first vendor may record the name, address, telephone number and/or e-mail address of each customer that purchases items within a predetermined time period (e.g. each month). The customer selected from the list may be, for example, the first customer that purchased items during a predetermined period of time. When a customer makes a purchase, the vendor server may determine if contact information of the customer is stored. For example, the vendor server may determine whether the customer is a member of a frequent shopper program (in which contact information is typically obtained upon registration). Alternatively, it may be determined whether the customer filled in a form on a Web page that requests contact information. If contact information of the customer is not stored, the vendor server can then request contact information of the customer, and wait for the customer to provide that contact information.

The controller then determines whether the selected customer should be provided an offer for a subsidy (step 1704) from a second vendor, as described above. If the customer should not be provided with an offer for a subsidy, then the controller determines whether there are more customers on the list (step 1708). If so, then another customer is selected (step 1702).

If the customer should be provided with an offer for a subsidy, then the controller 110 provides an indication of the offer for a subsidy to the selected customer using contact information of the customer (step 1706). The indication of an offer may be provided, for example, via e-mail, postal mail, and/or telephone. For example, the controller 110 may generate a textual message specifying the offer, and then transmit that message via e-mail to an e-mail address of the customer. The controller 110 may also generate a textual message which is printed onto a sheet of paper, and a postal mail address which is printed onto a mailing label. The mailing label is used in directing the sheet of paper to the customer via conventional postal mail. For example, the offer may be provided on a credit card billing statement of the customer. The controller 110 may also generate an audio message which is transmitted via a telephone to the customer by connecting to the appropriate telephone number.

Although the present invention has been described with respect to a preferred embodiment thereof, those skilled in the art will note that various substitutions may be made to those embodiments described herein without departing from the spirit and scope of the present invention. For example, although in many of the described embodiments above the benefit provided to the customer is a subsidy, there are many other types of benefits which are contemplated by the present invention.

What is claimed:

1. A method comprising:
receiving, by a controller device, an indication that a customer accepts an offer from a second vendor for a subsidy of a purchase, at a reduced price, of at least one item from a first vendor, the at least one item having an associated total price, and the offer defining an obligation for the customer to fulfill after purchasing the at least one item, the obligation being in addition to payment of the reduced price;
after receiving the indication of the acceptance of the offer, charging the reduced price for the at least one item to a credit card account of the customer;
determining, by the controller device, an expiration date of the offer by which the obligation must be fulfilled by the customer;
determining, by the controller device, that the customer did not fulfill the obligation before the expiration date; and
in response to determining that the customer did not fulfill the obligation before the expiration date, charging by the controller device to the credit card account of the customer at least the difference between the total price and the reduced price.

2. The method of claim 1, in which determining that the customer did not fulfill the obligation before the expiration date comprises:
receiving an indication that the customer did not initiate a new service agreement with the second vendor for a service.

3. The method of claim 2, in which the service comprises at least one of:
telephone service,
Internet service,
banking services,
credit card account service,
insurance service,
securities trading service,
satellite television service, and
cable television service.

4. The method of claim 1, in which determining that the customer did not fulfill the obligation before the expiration date comprises:
receiving an indication that the customer returned at least one of the at least one item to the first vendor.

5. The method of claim 1, further comprising:
receiving customer information from the customer; and
in which the step of determining that the customer did not fulfill the obligation before the expiration date comprises:
determining that the customer information is not accurate.

6. The method of claim 1,
in which the obligation includes a requirement that the customer make an additional purchase from the second vendor before the expiration date; and
in which determining that the customer did not fulfill the obligation before the expiration date comprises:
receiving an indication that the customer did not make an additional purchase from the second vendor before the expiration date.

7. A non-transitory data storage device storing instructions configured to direct a controller device to perform a method, the method comprising:
receiving, by a controller device, an indication that a customer accepts an offer from a second vendor for a subsidy of a purchase, at a reduced price, of at least one item from a first vendor, the at least one item having an associated total price, and the offer defining an obligation for the customer to fulfill after purchasing the at least one item, the obligation being in addition to payment of the reduced price;
after receiving the indication of the acceptance of the offer, charging the reduced price for the at least one item to a credit card account of the customer;
determining, by the controller device, an expiration date of the offer by which the obligation must be fulfilled by the customer;
determining, by the controller device, that the customer did not fulfill the obligation before the expiration date; and
in response to determining that the customer did not fulfill the obligation before the expiration date, charging by the controller device to the credit card account of the customer at least the difference between the total price and the reduced price.

8. The data storage device of claim 7, in which determining that the customer did not fulfill the obligation before the expiration date comprises:
receiving an indication that the customer did not initiate a new service agreement with the second vendor for a service.

9. The data storage device of claim 8, in which the service comprises at least one of:
telephone service,
Internet service,
banking services,
credit card account service,
insurance service,
securities trading service,
satellite television service, and
cable television service.

10. The data storage device of claim 7, in which determining that the customer did not fulfill the obligation before the expiration date comprises:
receiving an indication that the customer returned at least one of the at least one item to the first vendor.

11. The data storage device of claim 7, the instructions being configured further to direct the controller device to perform:
receiving customer information from the customer; and
in which determining that the customer did not fulfill the obligation before the expiration date comprises:
determining that the customer information is not accurate.

12. The data storage device of claim 7,
in which the obligation includes a requirement that the customer make an additional purchase from the second vendor before the expiration date; and
in which determining that the customer did not fulfill the obligation before the expiration date comprises:
receiving an indication that the customer did not make an additional purchase from the second vendor before the expiration date.

13. An apparatus comprising:
a processor; and
a data storage device in communication with the processor, the data storage device storing instructions configured to direct the processor to perform a method, the method comprising:
receiving an indication that a customer accepts an offer from a second vendor for a subsidy of a purchase, at a reduced price, of at least one item from a first vendor, the at least one item having an associated total price, and the offer defining an obligation for the customer to fulfill after purchasing the at least one item, the obligation being in addition to payment of the reduced price;

after receiving the indication of the acceptance of the offer, charging the reduced price for the at least one item to a credit card account of the customer;

determining an expiration date of the offer by which the obligation must be fulfilled by the customer;

determining that the customer did not fulfill the obligation before the expiration date; and in response to determining that the customer did not fulfill the obligation before the expiration date, charging to the credit card account of the customer at least the difference between the total price and the reduced price.

14. The apparatus of claim 13, in which determining that the customer did not fulfill the obligation before the expiration date comprises:

receiving an indication that the customer did not initiate a new service agreement with the second vendor for a service.

15. The apparatus of claim 14, in which the service comprises at least one of:

telephone service,
Internet service,
banking services,
credit card account service,
insurance service,
securities trading service,
satellite television service, and
cable television service.

16. The apparatus of claim 13, in which determining that the customer did not fulfill the obligation before the expiration date comprises:

receiving an indication that the customer returned at least one of the at least one item to the first vendor.

17. The apparatus of claim 13, the instructions being configured further to direct the processor to perform:

receiving customer information from the customer; and
in which determining that the customer did not fulfill the obligation before the expiration date comprises:
determining that the customer information is not accurate.

18. The apparatus of claim 13, in which the obligation includes a requirement that the customer make an additional purchase from the second vendor before the expiration date; and in which determining that the customer did not fulfill the obligation before the expiration date comprises:

receiving an indication that the customer did not make an additional purchase from the second vendor before the expiration date.

* * * * *